(12) United States Patent
Nishi

(10) Patent No.: US 9,983,553 B2
(45) Date of Patent: May 29, 2018

(54) AUTONOMOUS CONTROL DEVICE

(71) Applicant: Hitachi, Ltd., Chiyoda-ku, Tokyo (JP)

(72) Inventor: Masataka Nishi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 14/650,111

(22) PCT Filed: Mar. 11, 2013

(86) PCT No.: PCT/JP2013/056559
§ 371 (c)(1),
(2) Date: Jun. 5, 2015

(87) PCT Pub. No.: WO2014/141351
PCT Pub. Date: Sep. 18, 2014

(65) Prior Publication Data
US 2015/0309485 A1 Oct. 29, 2015

(51) Int. Cl.
*G05D 1/00* (2006.01)
*G05B 13/02* (2006.01)
(Continued)

(52) U.S. Cl.
CPC ........... *G05B 13/026* (2013.01); *B60W 30/09* (2013.01); *G05D 1/0088* (2013.01); *G06K 9/6878* (2013.01); *G06K 9/00805* (2013.01)

(58) Field of Classification Search
CPC ... G05B 13/026; B60W 30/09; G05D 1/0088; G06K 9/00805
See application file for complete search history.

(56) References Cited

U.S. PATENT DOCUMENTS

| 8,150,621 B1 | 4/2012 | Phillips et al. |
| 2006/0171562 A1 | 8/2006 | Yoshida |

(Continued)

FOREIGN PATENT DOCUMENTS

| JP | 2008-142841 A | 6/2008 |
| JP | 2008-152599 A | 7/2008 |

(Continued)

OTHER PUBLICATIONS

European Search Report issued in counterpart European Application No. 13878317.0 dated Dec. 16, 2016 (10 pages).

(Continued)

*Primary Examiner* — Robert Fennema
*Assistant Examiner* — Marzia T Monty
(74) *Attorney, Agent, or Firm* — Crowell & Moring LLP

(57) ABSTRACT

An object of the present invention is to provide an autonomous system that realizes expected operation in a form in which the soundness of the operation can be proved to a third party in adaptation to an external factor that dynamically varies and to enhance a working ratio in autonomous operation. The autonomous system is provided with a function for dynamically leading a satisfiable combination of a requirement for the soundness of operation and expected operation on the basis of the information of operating environment acquired via exterior world measurement means, a function for generating control logic for realizing the expected operation, a function for recording the control logic, the requirement for sound operation and the expected operation, and a function for presenting the record in a form in which the third party can read the record.

8 Claims, 25 Drawing Sheets

(51) Int. Cl.
*B60W 30/09* (2012.01)
*G06K 9/68* (2006.01)
*G06K 9/00* (2006.01)

(56) References Cited

U.S. PATENT DOCUMENTS

| | | |
|---|---|---|
| 2009/0062974 A1 | 3/2009 | Tamamoto et al. |
| 2010/0082195 A1 | 4/2010 | Lee et al. |
| 2010/0215254 A1* | 8/2010 | Prokhorov ........... G06K 9/3241 |
| | | 382/159 |
| 2010/0256835 A1* | 10/2010 | Mudalige ............... G08G 1/163 |
| | | 701/2 |
| 2012/0005390 A1 | 1/2012 | Hoang |
| 2013/0116909 A1 | 5/2013 | Shida |

FOREIGN PATENT DOCUMENTS

| | | |
|---|---|---|
| JP | 2009-80804 A | 4/2009 |
| JP | 2009-157735 A | 7/2009 |
| JP | 2012-30665 A | 2/2012 |
| JP | 2012-51560 A | 3/2012 |
| JP | 8-221126 A | 8/2016 |

OTHER PUBLICATIONS

International Search Report (PCT/ISA/210) dated Apr. 2, 2013 with English translation (3 pages).

\* cited by examiner

FIG.4

| REPRESENTATION OF SYMBOL | MEANING | COMPLEMENT |
|---|---|---|
| C0,C1,... | CONSTRAINT | REPRESENTS CONSTRAINT. IS FUNCTION THAT RETURNS TRUTH VALUE T/F |
| [C0]&[C1] | AND | AND OF CONSTRAINTS [C0],[C1] |
| [C0]\|\|[C1] | OR | OR OF CONSTRAINTS [C0],[C1] |
| ![C0] | NOT | DOES NOT MEET CONSTRAINT [C0] |
| [C0]→[C1] | If-then | MEETS CONSTRAINT [C1] AT ALL TIMES WHEN CONSTRAIN [C0] IS MET |
| T | True | TRUE. HEREINAFTER NOTED AS 1 |
| F | False | FALSE. HEREINAFTER NOTED AS 0 |

FIG.5

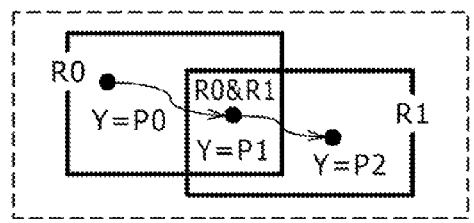

DEFINITION OF CONTROL LOGIC L

Action: $=[Y=P0] \rightarrow [Y=P1] \rightarrow [Y=P2]$ where
$P0 \in S0 = [[(R0(Y)=1) \& (R1(Y)=0)]]$
$P1 \in S1 = [[(R0(Y)=1) \& (R1(Y)=1)]]$
$P2 \in S2 = [[(R0(Y)=0) \& (R1(Y)=1)]]$
$L := \{L[0], L[1]\}$,
$L[0] = (Y \in S0) \rightarrow (Y \in S1)$
$L[1] = (Y \in S1) \rightarrow (Y \in S2)$

FIG. 6

| REPRESENTATION OF SYMBOL | MEANING | COMPLEMENT |
|---|---|---|
| X[C0] | NeXt | REPRESENTS ORDERED OPERATION. REPRESENTS OPERATION HAVING CONSTRAINT [C0] TO BE IMMEDIATELY TRUE FROM CURRENT TIME<br><br>OPERATION EXECUTION ORDER ID: T, T+1, T+2, T+3, T+4<br>CONSTRAINT ID C0: ?, 1, ?, ?, 0 |
| [C0]U[C1] | Until | REPRESENTS ORDERED OPERATION. CONTINUES TO KEEP AT LEAST CONSTRAINT [C0] TRUE UNTIL CONSTRAINT [C1] BECOMES TRUE FROM CURRENT TIME<br><br>OPERATION EXECUTION ORDER ID: T, T+1, T+2, T+3, T+4<br>CONSTRAINT ID C0: 1, 1, 1, ?, ?<br>C1: 0, 0, 1, ?, ? |
| [C0]R[C1] | Release | REPRESENTS ORDERED OPERATION. CONTINUES TO KEEP CONSTRAINT [C1] TRUE UNTIL CONSTRAINT [C0] BECOMES TRUE FOR FIRST TIME FROM CURRENT TIME. IS EQUIVALENT TO ORDERED OPERATION !((!(C0])U[C1])<br><br>OPERATION EXECUTION ORDER ID: T, T+1, T+2, T+3, T+4<br>CONSTRAINT ID C0: 0, 0, 1, ?, ?<br>C1: 1, 1, 1, ?, ? |
| G[C0] | Globally | REPRESENTS ORDERED OPERATION. KEEPS CONSTRAINT [C0] TRUE AT ALL TIMES<br><br>OPERATION EXECUTION ORDER ID: T, T+1, T+2, T+3, T+4<br>CONSTRAINT ID C0: 1, 1, 1, 1, 1 |
| F[C1] | Future | MEETS CONSTRAINT [C0] ONCE OR MORE TIMES AT SOME TIME IN FUTURE FROM CURRENT TIME. IS EQUIVALENT TO [True]U[C1]<br><br>OPERATION EXECUTION ORDER ID: T, T+1, T+2, T+3, T+4<br>CONSTRAINT ID C0: 1, 1, 1, 1, 1<br>C1: 0, 0, 1, ?, ? |
| [C0]W[C1] | Weakly Until | CONTINUES OF KEEP CONSTRAINT [C0] TRUE AT ALL TIMES OR CONTINUES TO KEEP CONSTRAINT [C0] TRUE AT LEAST UNTIL CONSTRAINT [C1] BECOMES TRUE FROM CURRENT TIME. IS EQUIVALENT TO (([C0]U[C1])||G[C0])<br><br>OPERATION EXECUTION ORDER ID: T, T+1, T+2, T+3, T+4<br>CONSTRAINT ID C0: 1, 1, 1, 1, 1<br>C1: 0, 0, 1, ?, ? |

FIG. 7

| REPRESENTATION OF SYMBOL | EQUIVALENT RESTRICTION FORM | CLASSIFICATION OF CONTENTS TO PRESENTATION DEVICE IN APPLYING RELAXING CONDITION | COMPLEMENT |
|---|---|---|---|
| $G_G[C0]$ | $G[C0]$ | ·MESSAGE IN UNSATISFIABLE CASE | RESTRICTION FORM THAT CANNOT BE RELAXED FROM $G[C0]$ |
| $G_X[C0]$ | $G[C0]\|\|X[C0]$ | ·MESSAGE IN UNSATISFIABLE CASE<br>·MESSAGE WHEN $X[C0]$ IS APPLIED | RESTRICTION FORM CAN BE RELAXED IN ORDER OF $G[C0]$ OR $X[C0]$, HOWEVER, IT CANNOT BE RELAXED TO $F[C0]$ OR $!G[C0]$ |
| $G_F[C0]$ | $G[C0]\|\|X[C0]\|\|F[C0]$ | ·MESSAGE IN UNSATISFIABLE CASE<br>·MESSAGE WHEN $X[C0]$ IS APPLIED<br>·MESSAGE WHEN $F[C0]$ IS APPLIED | RESTRICTION FORM CAN BE RELAXED IN ORDER OF $G[C0]$ OR $X[C0]$ OR $F[C0]$, HOWEVER, IT CANNOT BE RELAXED TO $!G[C0]$ |
| $G_N[C0]$ | $G[C0]\|\|X[C0]\|\|F[C0]\|\|G[!C0]$ | ·MESSAGE IN UNSATISFIABLE CASE<br>·MESSAGE WHEN $X[C0]$ IS APPLIED<br>·MESSAGE WHEN $F[C0]$ IS APPLIED | RESTRICTION FORM CAN BE RELAXED IN ORDER OF $G[C0]$ OR $X[C0]$ OR $F[C0]$ OR $G[!C0]$ |
| $X_X[C0]$ | $X[C0]$ | ·MESSAGE IN UNSATISFIABLE CASE | RESTRICTION FORM THAT CANNOT BE RELAXED FROM $X[C0]$ |
| $X_F[C0]$ | $X[C0]\|\|F[C0]$ | ·MESSAGE IN UNSATISFIABLE CASE<br>·MESSAGE WHEN $F[C0]$ IS APPLIED | RESTRICTION FORM CAN BE RELAXED IN ORDER OF $X[C0]$ OR $F[C0]$ OR $F[C0]$, HOWEVER, IT CANNOT BE RELAXED TO $!G_X[C0]$ |
| $X_N[C0]$ | $X[C0]\|\|F[C0]$ $G[!C0]$ | ·MESSAGE IN UNSATISFIABLE CASE<br>·MESSAGE WHEN $F[C0]$ IS APPLIED | RESTRICTION FORM CAN BE RELAXED IN ORDER OF $X[C0]$ OR $F[C0]$ OR $!X[C0]$ |
| $F_F[C0]$ | $F[C0]$ | ·MESSAGE IN UNSATISFIABLE CASE | RESTRICTION FORM THAT CANNOT BE RELAXED FROM $F[C0]$ |
| $F_N[C0]$ | $F[C0]\|\|G[!C0]$ | ·MESSAGE IN UNSATISFIABLE CASE | RESTRICTION FORM CAN BE RELAXED IN ORDER OF $F[C0]$ OR $\neg F[C0]$ |

| RECOGNITION OBJECT ID | CLASSIFICATION OF RECOGNITION OBJECTS | CONSTRAINT ID | STATE VALUE OF RECOGNITION OBJECT | RESTRICTION FORM WITH RELAXING CONDITION THAT DESIGNATES OPERATING RULE |
|---|---|---|---|---|
| OBJ0 | CL0 | C0 | $y0(t)$ | $FUNC\_OBJ0(C0(Y),C1(Y))$ |
| | | C1 | | |
| OBJ1 | CL1 | C2 | --- | $FUNC\_OBJ1(C2(Y))$ |
| | CL0 | C3 | $y2(t)$ | $FUNC\_OBJ2(C3(Y),C4(Y))$ |
| | | C4 | | |

```
begin
    int xID=IDS;
    xID=EXEC(F0,F0E,ID1,ID4);
    if(EVAL(BF0)=SAT){
        while(True){
            if(EVAL(RF0)=SAT){
                xID=EXEC(RF0,True,halt,ID1,ID4);
                break;
            }else{
                xID=EXEC(F3,F2E,halt,ID2,ID4);
            };
        };
    }else{
        xID=EXEC(BF0,True,halt,ID2,ID4);
    };
    xID=EXEC(F4,F4E,halt,IDE,IDE);
end;
```

FIG.16

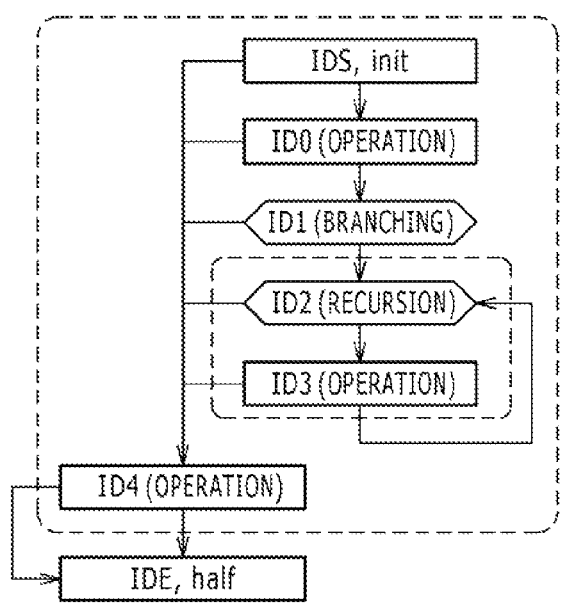

| OPERATION ID | EXPECTED OPERATION E (RESTRICTION FORM WITH RELAXING CONDITION) | OPERATION COMPLETION DETERMINATION CONDITION (CONSTRAINT) | BRANCHING CONDITION AFTER ACQUISITION OF RESPONSE | | |
|---|---|---|---|---|---|
| | | | SAT PROCESSING AT SATISFIABLE TIME | COMP PROCESSING AFTER COMPLETION | UNSAT PROCESSING AT UNSATISFIABLE TIME |
| IDS | True | True | --- | TRANSITION TO ID0 | --- |
| ID0 | F0 | F0E | halt | TRANSITION TO ID1 | TRANSITION TO ID4 |
| ID1 | BF0(BRANCHING CONDITION) | True | --- | TRANSITION TO ID2 | TRANSITION TO ID4 |
| ID2 | BF0(RECURRING CONDITION) | True | --- | TRANSITION TO ID3 | TRANSITION TO ID4 |
| ID3 | F3 | F3E | halt | TRANSITION TO ID2 | TRANSITION TO ID4 |
| ID4 | F4 | F4E | halt | TRANSITION TO IDE | TRANSITION TO IDE |
| IDE | True | True | halt | halt | halt |

010311  010312  010313  010314  010315

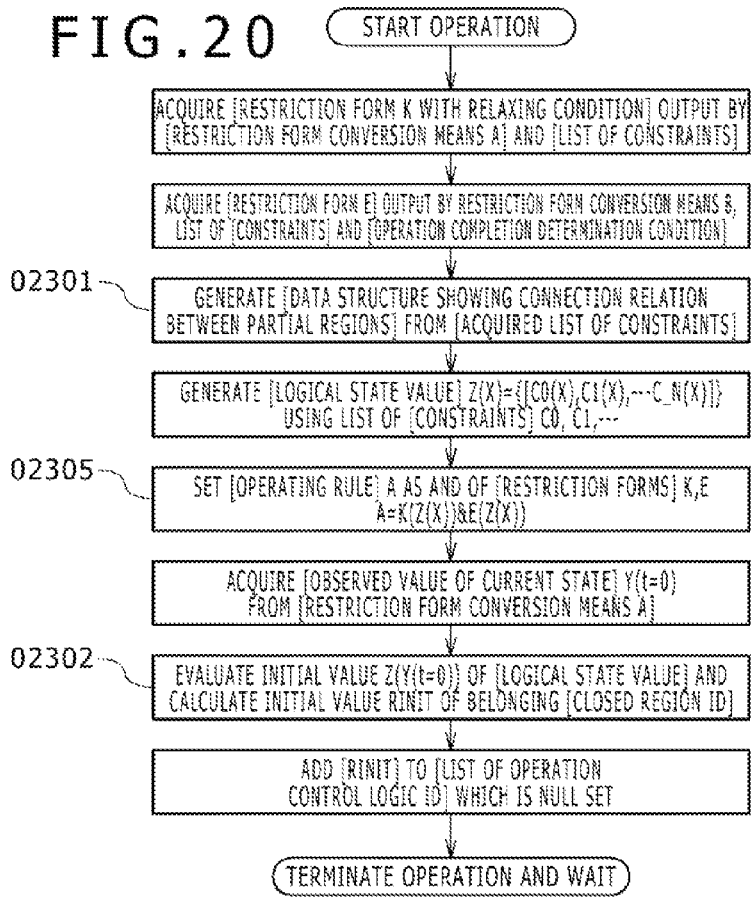

TRANSITION OPERATION FROM CLOSED REGION R0-0 TO CLOSED REGION R2-2

FIG.24
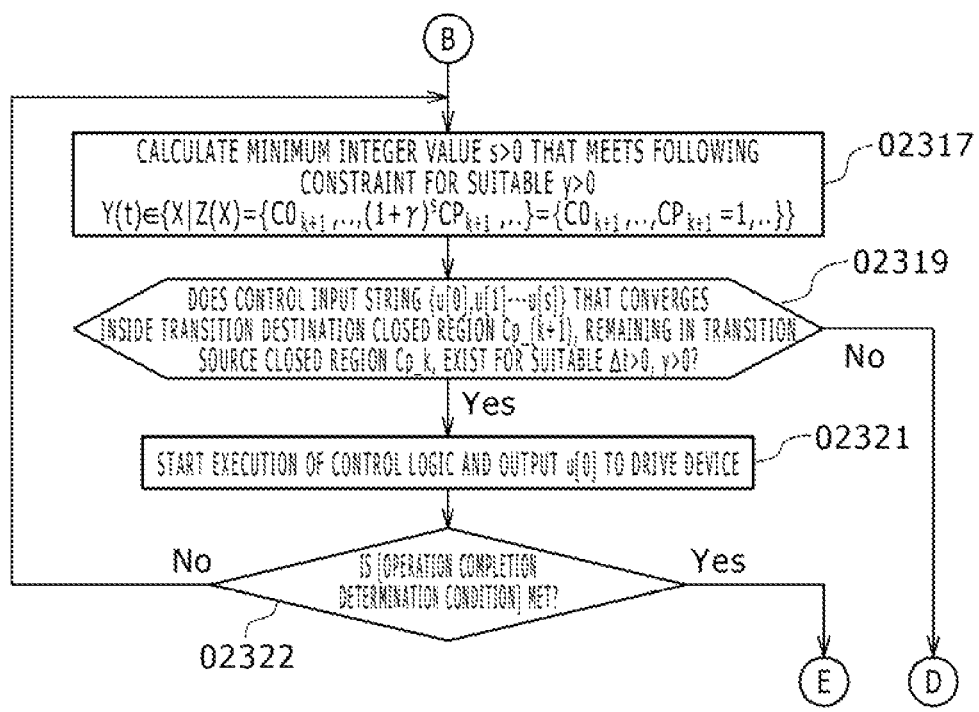
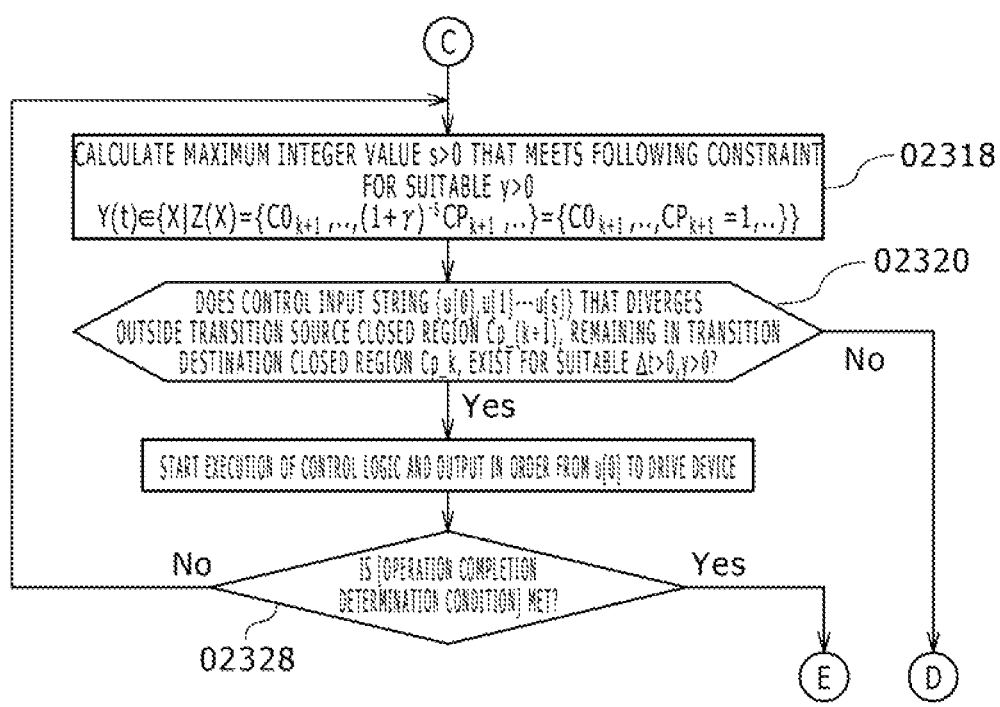

FIG.30

| OPERATION ID | EXPECTED OPERATION E (RESTRICTION FORM WITH RELAXING CONDITION) | OPERATION COMPLETION DETERMINATION CONDITION (CONSTRAINT) | BRANCHING CONDITION AFTER ACQUISITION OF RESPONSE | | |
|---|---|---|---|---|---|
| | | | SAT PROCESSING AT SATISFIABLE TIME | COMP PROCESSING AFTER COMPLETION | UNSAT PROCESSING AT UNSATISFIABLE TIME |
| IDS | True | True | --- | TRANSITION TO ID0 | --- |
| ID0 | $F_F[r(t) \in S_{GOAL}]$ | $[r(t) \in S_{GOAL}]$ | halt | TRANSITION TO IDE | TRANSITION TO IDE |
| IDE | True | True | halt | TRANSITION TO ID2 | halt |
| | 030311 | 030312 | 030313 | 030314 | 030315 |

FIG. 31

| RECOGNITION OBJECT | CONSTRAINT | STATE VALUE OF RECOGNITION OBJECT | RESTRICTION FORM WITH RELAXING CONDITION X THAT DESIGNATES SOUND OPERATING RULE | CLASSIFICATION OF CONTENTS TO PRESENTATION DEVICE IN APPLYING RELAXING CONDITION | |
|---|---|---|---|---|---|
| ROAD | CONSTRAINT P SHOWING ROAD-OCCUPIED REGION | NONE | $[P] \rightarrow (G_G[P])$ | CASE THAT $[P] \rightarrow G_G[P]$ IS UNSATISFIABLE | OUTPUT CONSTRAINT THAT MAKES OPERATION TRAVELING INSIDE ROAD-OCCUPIED REGION P UNSATISFIABLE TO DISPLAY |
|  | CONSTRAINT Q SHOWING ALLOWABLE TRAVELING DIRECTION |  |  | CASE THAT $[P] \rightarrow G_G[Q]$ IS UNSATISFIABLE | OUTPUT CONSTRAINT THAT MAKES OPERATION PROGRESSING IN ALLOWABLE TRAVELING DIRECTION UNSATISFIABLE TO DISPLAY |
| SIGNAL | CONSTRAINT P SHOWING SIGNAL LIGHT IS red | INDICATION VALUE OF SIGNAL Sign(t) | $([P] \rightarrow G_X[]Q])$ & $([P] \rightarrow G_G[]Q])$ | CASE OF REPLACEMENT WITH $[P] \rightarrow []Q]$ | OUTPUT CONTINUOUS PATH OUTGOING OUTSIDE CONSTRAINT OBJECT CLOSED REGION Q TO DISPLAY |
|  | CONSTRAINT OBJECT CLOSED REGION Q INDICATED BY SIGNAL |  |  | CASE THAT $[P] \rightarrow G_G[]Q]$ IS UNSATISFIABLE | OUTPUT CONSTRAINT THAT MAKES CONTINUOUS PATH GOING OUT OF CONSTRAINT OBJECT CLOSED REGION Q UNSATISFIABLE TO DISPLAY |
|  |  |  |  | CASE THAT $[P] \rightarrow G_G[]Q]$ IS UNSATISFIABLE | OUTPUT CONSTRAINT THAT MAKES CONTINUOUS PATH GOING OUT OF CONSTRAINT OBJECT CLOSED REGION Q UNSATISFIABLE TO DISPLAY |
| INTER-SECTION | CONSTRAINT P SHOWING OCCUPIED REGION OF INTERSECTION | NONE | $[P] \rightarrow X_F([P] \& G_G[]Q])$ | CASE OF REPLACEMENT WITH $[P] \rightarrow F([P] \& []Q])$ | OUTPUT CONTINUOUS PATH GOING OUT OF CONSTRAINT OBJECT CLOSED REGION Q TO DISPLAY |
|  |  |  |  | CASE THAT $[P] \rightarrow G_G[]Q]$ IS UNSATISFIABLE | OUTPUT CONSTRAINT THAT MAKES CONTINUOUS PATH GOING OUT OF CONSTRAINT OBJECT CLOSED REGION Q UNSATISFIABLE TO DISPLAY |
|  |  |  |  | CASE THAT $[P] \rightarrow G_F[]Q]$ IS UNSATISFIABLE | OUTPUT CONSTRAINT THAT MAKES CONSTRAINT Q SHOWING OPERATION PROGRESSING IN ALLOWABLE TRAVELING DIRECTION UNSATISFIABLE TO DISPLAY |
| PEDES-TRIAN | CONSTRAINT P SHOWING OCCUPIED REGION BY PEDESTRIAN | SPATIAL POSITION z(t) TRAVELING SPEED dz(t) | $G_G([P] \& G_F[]Q])$ | CASE THAT $G_F[]Q]$ IS UNSATISFIABLE | OUTPUT WARNING FOR TELLING RISK OF REACH OF PEDESTRIAN TO DISPLAY |
|  |  |  |  | CASE THAT $G_F[]Q]$ IS REPLACED WITH F[Q] | OUTPUT CONTINUOUS PATH GOING OUTSIDE REACH OF PEDESTRIAN TO DISPLAY |
|  |  |  |  | CASE THAT $G_F[]Q]$ IS REPLACED WITH F[Q] | OUTPUT CONTINUOUS PATH GOING OUTSIDE REACH OF PEDESTRIAN TO DISPLAY |
|  |  |  |  | CASE THAT $G_F[]Q]$ IS UNSATISFIABLE | OUTPUT WARNING FOR TELLING RISK OF COLLISION TO PEDESTRIAN TO DISPLAY |
| VEHICLE | CONSTRAINT Q SHOWING REACH OF VEHICLE | SPATIAL POSITION z(t) TRAVELING SPEED dz(t) | $G_G([P] \& G_X[]Q])$ | CASE THAT $G_F[]Q]$ IS UNSATISFIABLE | OUTPUT WARNING FOR TELLING RISK OF COLLISION TO VEHICLE TO DISPLAY |
|  | STATE VALUE OF RECOGNITION OBJECT |  |  | CASE THAT $G_F[]Q]$ IS REPLACED WITH F[Q] | OUTPUT CONTINUOUS PATH GOING OUTSIDE REACH OF VEHICLE TO DISPLAY |
|  |  |  |  | CASE THAT $G_F[]Q]$ IS UNSATISFIABLE | OUTPUT WARNING FOR TELLING RISK OF COLLISION TO VEHICLE TO DISPLAY |

FIG.32

| CLASSIFICATION OF RECOGNITION OBJECTS | CONSTRAINT | STATE VALUE OF RECOGNITION OBJECT | RESTRICTION FORM K WITH RELAXING CONDITION THAT DESIGNATES SOUND OPERATING RULE |
|---|---|---|---|
| ROAD 0 | CONSTRAINT C0 SHOWING ROAD-OCCUPIED REGION | NONE | $C0 \rightarrow G_G[C0] \& G_G[C6]$ |
| | CONSTRAINT C6 SHOWING ALLOWABLE TRAVELING DIRECTION | | |
| ROAD 1 | CONSTRAINT C1 SHOWING ROAD-OCCUPIED REGION | NONE | $C1 \rightarrow G_G[C1] \& G_G[C7]$ |
| | CONSTRAINT C7 SHOWING ALLOWABLE TRAVELING DIRECTION | | |
| SIGNAL 0 | CONSTRAINT C5 SHOWING THAT SIGNAL LIGHT IS red | INDICATION VALUE OF SIGNAL sign(t) | $([!C5] \rightarrow G_X[!C4]) \&$ $([C5] \rightarrow G_G[!C4])$ |
| | CONSTRAINT OBJECT CLOSED REGION C4 INDICATED BY SIGNAL | | |
| INTERSECTION 0 | CONSTRAINT C2 SHOWING OCCUPIED REGION OF INTERSECTION | NONE | $C2 \rightarrow (X_F[!C2] \& G_G[C6 \& C7])$ |
| | CONSTRAINT C6,C7 SHOWING ALLOWABLE TRAVELING DIRECTION | | |

FIG.33

OPERATION CONTROL LOGIC WHEN SIGNAL VALUE IS NOT RED

| OPERATION CONTROL LOGIC ID | | 0 | 1 | 2 | 3(GOAL) |
|---|---|---|---|---|---|
| CLOSED REGION ID R[k] | | R[0]=[R0-0-1] | R[1]=[R0-1-0] | R[2]=[R0-2-0-1] | R[3]=[R0-2-1-1] |
| CONSTRAINT ID | C0 | C0[0]=1 | C0[1]=1 | C0[2]=1 | C0[3]=0 |
| | C1 | C1[0]=0 | C1[1]=1 | C1[2]=0 | C1[3]=0 |
| | C2 | C2[0]=0 | C2[1]=1 | C2[2]=0 | C2[3]=0 |
| | C3 | C3[0]=0 | C3[1]=0 | C3[2]=0 | C3[3]=1 |
| | C4 | C4[0]=0 | C4[1]=1 | C4[2]=0 | C4[3]=0 |
| | C5 | C5[0]=0 | C5[1]=0 | C5[2]=0 | C5[3]=0 |
| | C6 | C6[0]=1 | C6[1]=1 | C6[2]=1 | C6[3]=1 |
| | C7 | C7[0]=1 | C7[1]=1 | C7[2]=1 | C7[3]=1 |
| CONTROL LOGIC L[k] | | INIT | L[0]=[R0-0-1] =>[R0-1-0] | L[1]=[R0-1-0] =>[R0-2-0-1] | L[2]=[R0-2-0-1] =>[R0-2-1-1] | END |
| GROUP V OF APPLIED RELAXING CONDITIONS | | -- | {V[0]} | {V[1]} | {V[2]} | -- |

AUTONOMOUS CONTROL DEVICE

TECHNICAL FIELD

The present invention relates to an autonomous operation control unit that determines an autonomous system operated in open environment and the operation of the autonomous system.

BACKGROUND ART

A system equipped with measurement means of a situation of operating environment and provided with an autonomous function for judging and controlling autonomous operation without requiring the intervention of an operator according to a stored program has been researched.

One example of a concrete autonomous system is an autonomous mobile robot that is disclosed in Patent Literature 1 and that travels to a destination, satisfying a condition of sound operation for avoiding collision with a circumferential person who indeterminately moves, an autonomous work system that executes predetermined work in addition to the corresponding mobile function, and a fully autonomous running type automobile utilizing a function for generating a path to a remote destination.

In Patent Literature 2, a robot provided with an autonomous mobile function in closed environment is presented.

In Patent Literature 3, an autonomous work system remotely operated via a channel is disclosed. This patent literature discloses an embodiment that a remote operation function at real time and an autonomous operation function can be selected, a remote operator programs expected operation beforehand or instructs it at a small frequency as required and the autonomous work system implements the instructed expected operation.

Patent Literature 4 discloses, as a semi-autonomous system in which an operator rides and ordinarily directly directs expected operation, an autonomous system provided with a function for detecting distance between cars and making intervention control so as to avoid collision between adjacent running vehicles and specialized in running support.

CITATION LIST

Patent Literature

Patent Literature 1: Japanese Unexamined Patent Application Publication No. 2009-157735
Patent Literature 2: Japanese Unexamined Patent Application Publication No. 2009-80804
Patent Literature 3: Japanese Unexamined Patent Application Publication No. 2012-51560
Patent Literature 4: Japanese Unexamined Patent Application Publication No. 2012-30665

SUMMARY OF INVENTION

Technical Problem

An autonomous system operated in open environment is required to determine operation in adaptation to an external factor that dynamically and indeterminately varies. However, in the existing method of supposing a concrete operation mode at a design stage and all designing individual control logic, it is not guaranteed to be able to realize expected operation, satisfying the soundness of operation according to varying external environment and it is difficult to all verify realizability in a short time.

Besides, in spite of a characteristic that the autonomous system is operated without intervention by a person, an external burden of proof to soundness in an operation determination process in which its behavior is determined and transparency for backing up this, that is, observability in the operation determination process is not considered, an operation mode and the corresponding control logic are stored in the form of a program and others, it is difficult that a third party directly refers to them and evaluates them in operation, and information actually acquired by observation is limited to behavior finally realized according to the control logic.

The method presented in Patent Literature 1 proposes a method of supposing a situation in which a mobile obstacle called a pedestrian exists in circumferential environment of the autonomous system, dynamically setting a non-enterable region, autonomously adjusting the non-enterable region by extending or reducing the non-enterable region, and installing control logic including an operation mode for pursuing expected operation in which a path for avoiding the non-enterable region is generated and followed in designing.

However, operation when a region including the current position of the autonomous system suddenly belongs to the inside of the non-enterable region according to the variation of an external factor is not supposed, and when operation is continued according to a program set beforehand in such a case, soundness is not guaranteed because operation in such a situation is not verified.

Therefore, it is natural that operation be described so that the autonomous system is stopped from a viewpoint of safety in the circumference of the autonomous system as one measure for abnormality in designing the control logic. However, in such operational environment that the autonomous system cannot be suddenly stopped, the soundness of the operation is lost since the stop.

Moreover, when solution is made by means such as a reset by a person in abnormal termination, operation is stopped every time there occur operation modes in which the soundness of operation is not verified, and a rate of operation in autonomous operation may be remarkably deteriorated in spite of a characteristic that the autonomous system is operated without intervention by a person.

Therefore, it is important to improve the comprehensiveness of an operation mode in which the soundness of operation is verified.

In the method presented in Patent Literature 1, an operation mode in which the soundness of operation is not verified is equivalent to operation in a state in which control logic designed corresponding to an operation mode supposed at the stage of design does not satisfy a premise tacitly assumed so as to satisfy the soundness of operation. Since such an operational situation is not supposed at the time of design, it is sequentially modified when the operational situation is found in a prototype test. However, in such a method of sequentially modifying on the basis of the operation mode initially supposed and designing the control logic of the autonomous system, it is difficult to guarantee the comprehensiveness of operating environment actually encountered and the soundness of the corresponding control logic. In addition, the method presented in Patent Literature 1 has a problem that the number of operation modes to be supposed and the number of control logics to be designed increase explosively in combination according to the variety of external factors accompanied by the setting and a change of a non-enterable region.

Solution to Problem

To solve the problems, an autonomous control device that generates operation control logic for implementing operation adapted to an internal state of a self-system and an external factor acquired by exterior world measurement means in open exterior environment on the basis of the operation control logic stored in a storage and instructs a drive device to operate in the open exterior environment is provided with an autonomous operation control unit that generates operation control logic and control logic on the basis of a constraint corresponding to an external factor acquired from the exterior world measurement means and an internal state of the autonomous system and a constraint related to expected operation demanded for the autonomous system and the soundness of the operation every time the operation control logic is sequentially reconstructed, writes the generated operation control logic and information acquired from the exterior world measurement means to the recording unit, and instructs the autonomous system to operate on the basis of the control logic, and an expected operation determination unit that designates the expected operation demanded for the autonomous system on the basis of a result of the judgment of the expected operation and the soundness of the operation by the autonomous operation control unit.

Advantageous Effects of Invention

Since sound operation is implemented in an operation mode adapted to a varying external factor by sequentially generating control logic in which the soundness of the operation is verified and the generated control logic is recorded and presented, a third party can verify the soundness of the operation by referring to an operation determination process.

BRIEF DESCRIPTION OF DRAWINGS

FIG. 4 shows the notation of a constraint and a logical expression.

FIG. 5 shows the definition of control logic L.

FIG. 6 shows the representation of operation in a restriction form.

FIG. 7 shows the representation of an operating rule in a restriction form with a relaxed condition and expected operation.

FIG. 16 shows control structure of a program that designates expected operation determination logic.

FIG. 20 shows the analysis of connection relation between closed regions.

FIG. 21 shows a list of executable operation control logics.

FIG. 24 shows a flow of the execution process of the control logic.

FIG. 30 shows contents of an autonomous running control program used in a third embodiment.

FIG. 31 shows a conversion rule used by restriction form conversion means A in the third embodiment.

FIG. 32 shows a restriction form K with a relaxing condition output by the restriction form conversion means A in the third embodiment.

FIG. 33 shows operation control logic generated when a signal value is not "red" in the third embodiment.

DESCRIPTION OF EMBODIMENTS

First Embodiment

Figure 1:
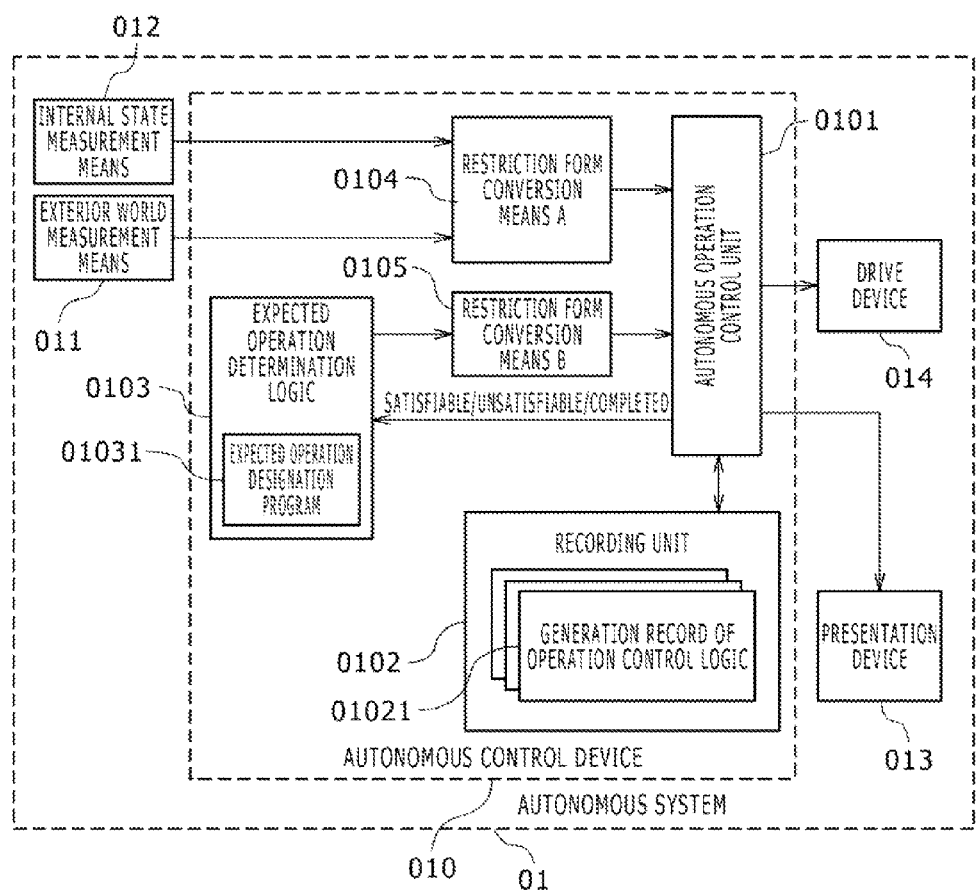
FIG. 1 is a block diagram showing an autonomous system.

A first embodiment of an autonomous system using the present invention will be described below. FIG. 1 is a block diagram showing the autonomous system. The autonomous system 01 operated in open exterior environment is provided with an autonomous control device 010, exterior world measurement means 011, internal state measurement means 012, a presentation device 013 and a drive device 014. The autonomous control device 010 is configured by an autonomous operation control unit 0101, a recording unit 0102, expected operation determination logic 0103, restriction form conversion means A (0104) and restriction form conversion means B (0105).

The restriction form conversion means A (0104) converts information of open exterior environment information acquired via the exterior world measurement means 011 to a restriction form and passes it to the autonomous operation control unit 0101.

The recording unit 0102 stores a generation record 01021 of operation control logic generated by the autonomous operation control unit 0101. The autonomous operation control unit 0101 presents the generation record 01021 of this operation control logic to the presentation device 013 as required.

The expected operation determination logic 0103 is operated according to an expected operation designation program 01031, the restriction form conversion means B 0105 converts this expected operation determination logic 0103 to a restriction form, and the restriction form conversion means B 0105 passes it to the autonomous operation control unit 0101. The autonomous operation control unit 0101 determines the satisfiability of expected operation converted to the restriction form and returns its result as satisfiable, unsatisfiable or completed. The autonomous operation control unit 0101 outputs a control command to the drive device 014 after a process shown in FIG. 2.

Figure 2:
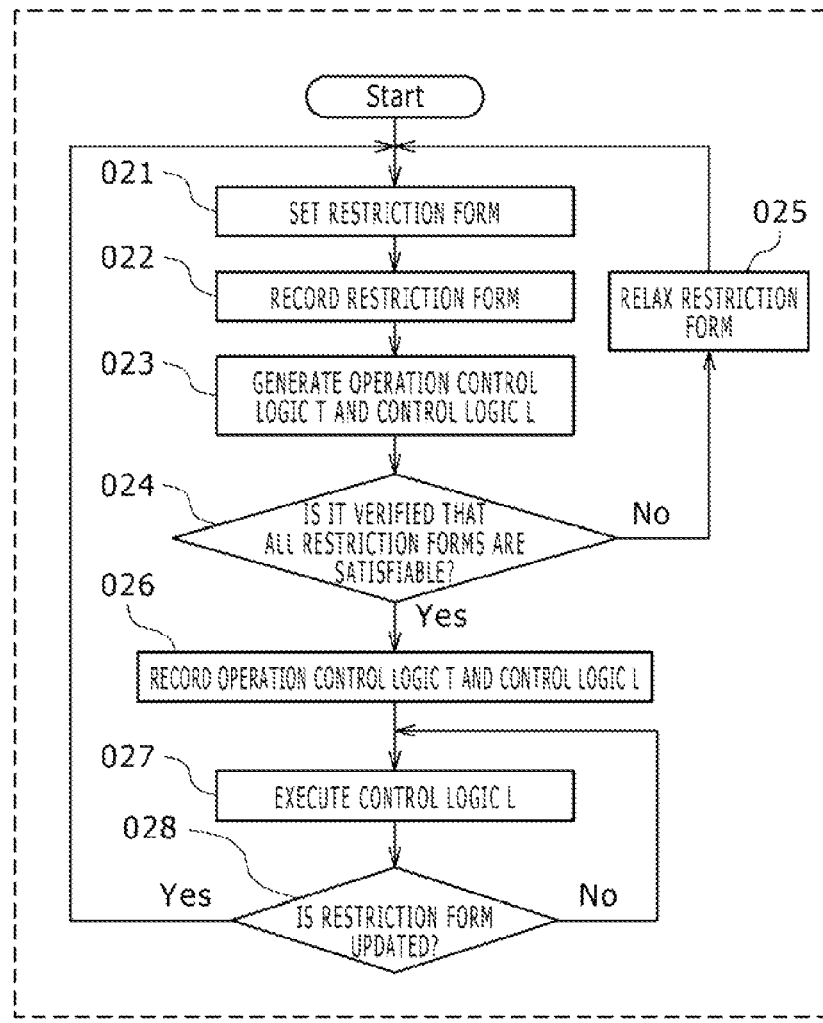
FIG. 2 shows a process flow of an autonomous operation control unit.

FIG. 2 snows a process flow executed in the autonomous control device 010.

First, in a step 021, lists of restriction forms output by the restriction form conversion means A (0104) and the restriction form conversion means B (0105) are received and the restriction forms to be processed are set. In the next step 022, the lists of restriction forms received in the step 021 are stored in the recording unit 0102.

In a step 023, operation control logic T of the whole autonomous system 01 that satisfies a list of restriction forms set in the step 021 and control logic L for calculating a control command output to the drive device 014 are generated. In a step 024, it is verified that the operation control logic T which satisfies all the restriction forms set in the step 021 and the control logic L are realizable. When a result of the verification is determined as realizable, the process proceeds to a step 026 and in the step 026, the operation control logic T and the control logic L are stored in the recording unit 0102. In the meantime, when the result of the verification is determined as unrealizable, the process proceeds to a step 025, the list of restriction forms recorded in the step 022 is read, and at least a part of the restriction forms set in the step 021 is relaxed. For example, when the restrictions determined as unsatisfiable in the step 024 can be relaxed, they are replaced with the relaxed restriction forms. Next, the processing is returned to the step 021 and the processing is repeated.

After the operation control logic T and the control logic L are recorded in the step 026, the process proceeds to a step 027 and a control command is output to the drive device 014 on the basis of the control logic L. In a step 028, it is verified whether the restriction form set in the step 021 is updated or not. When the restriction form is not updated, the processing is returned to the step S27, operation is continued on the basis of the same control logic L, and when the restriction form is updated, the processing is returned to the step 021.

Figure 3:
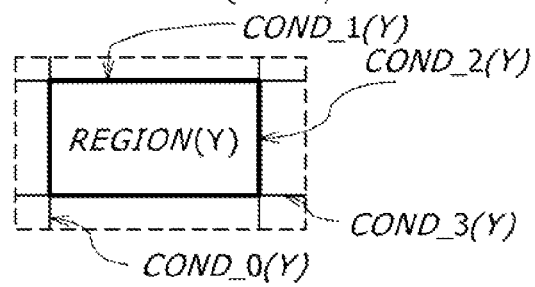
FIG. 3 shows the definition of a closed region.

Next, a detailed method of realizing data structure used inside the autonomous operation control unit 0101 will be described. A constraint will be defined as a function COND (X) that returns a truth value TRUE (1) or FALSE (0) for a set internal state X below. FIG. 3 shows the definition of constraints that represent a closed region REGION(Y) by combining the plural constraints (COND_0(Y) to COND_3 (Y)). These constraints are constructed as a logical product of the individual constraint for determining the inside of a half-plane group that provides planes of the closed region in parameter space Y representing the internal state. In addition, a more complex constraint can be represented by combining the logical product AND, the logical product sum OR, negation NOT and conditional restriction of the individual constraint. FIG. 4 shows operators and their symbol notations for constructing a complex constraint by combining constraints.

Referring to FIG. 5, a method of representing operation which the control logic L outputs will be described using a constraint showing a closed region and a conditional constraint below. In this example, operation that moves from a point P0 in a closed region R0& (!R1) to a point P2 in a closed region !R0&R1 via a point P1 in a closed region R0&R1 in the defined two closed regions R0, R1 is represented as Action.

FIG. 6 shows the definition of a restriction form (an operator) having a constraint Ci as an argument.

An operator X[C0] for a constraint C0 is a restriction form for representing conditional operation. The operator denotes a restriction form for representing the operation that satisfies the constraint C0 to be an argument (the operation in which an evaluation value of the constraint C0 is TRUE) in the next order in a suitably set sequential string.

An operator [C0]U[C1] for constraints C0 and C1 is a restriction form for representing conditional operation. Until the constraint C1 becomes 1, the operator represents the operation that continues to at least maintain 1 as a value of the constraint C0.

An operator [C0]R[C1] for the constraints C0 and C1 is a restriction form for representing conditional operation. Until the constraint C0 becomes 1 at the first time since the current time, the constraint C0 continues to be 1.

An operator G[C0] for the constraint C0 is a restriction form for representing conditional operation. The operator represents the operation that continues to maintain 1 as the value of the constraint C0 at arbitrary time.

An operator F[C0] for the constraint C0 is a restriction form for representing conditional operation. The operator represents the operation that meets "the constraint C0=1" at some time in future since the current time more than once.

An operator [C0]W[C1] for the constraints C0 and C1 is a restriction form for representing conditional operation. The operator represents the operation that continuously continues to maintain 1 as the value of the constraint C0 or the operation that continues to maintain 1 as the value of the constraint C0 at least until the constraint C1 becomes 1 since the current time.

FIG. 7 snows the definition of a restriction form with a relaxing condition having a restriction form Ci as an argument and expected operation. Each restriction form with a relaxing condition is given in the form of the logical OR of one or more restriction forms and is classified on the basis of the possibility of relaxation of restriction related to a sequential string. For each restriction form with a relaxing condition, presented contents to the presentation device 013 that corresponds to a case in which the relaxing condition is applied are determined.

The autonomous operation control unit 0101 receives data of the restriction forms represented in these operators and transcription from the restriction form conversion means A (0104) and the restriction form conversion means B (0105).

Figure 8:
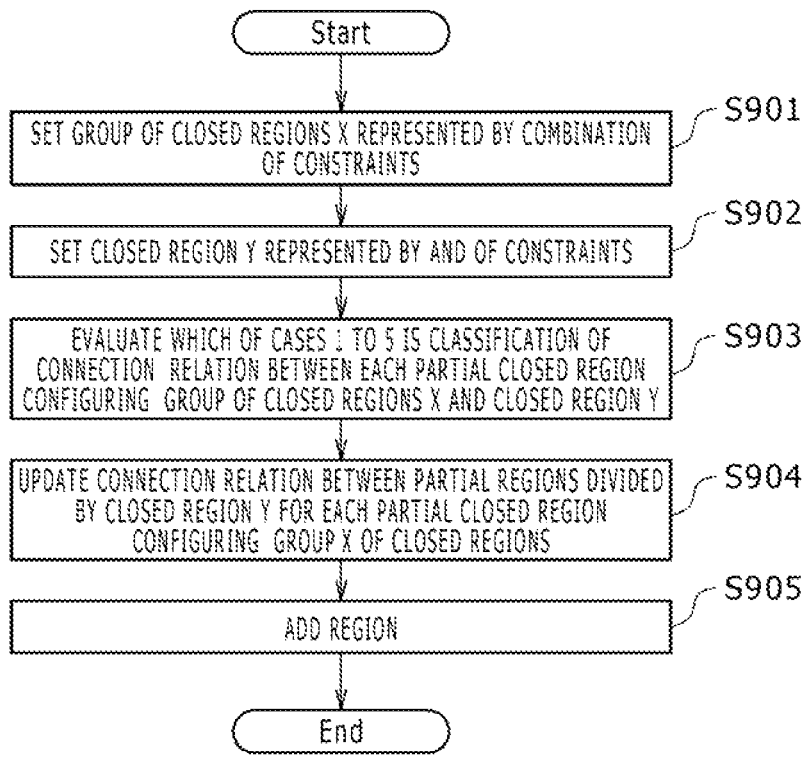
FIG. 8 shows a flow of a construction process of data structure showing connection relation between partial regions.
Figure 9:
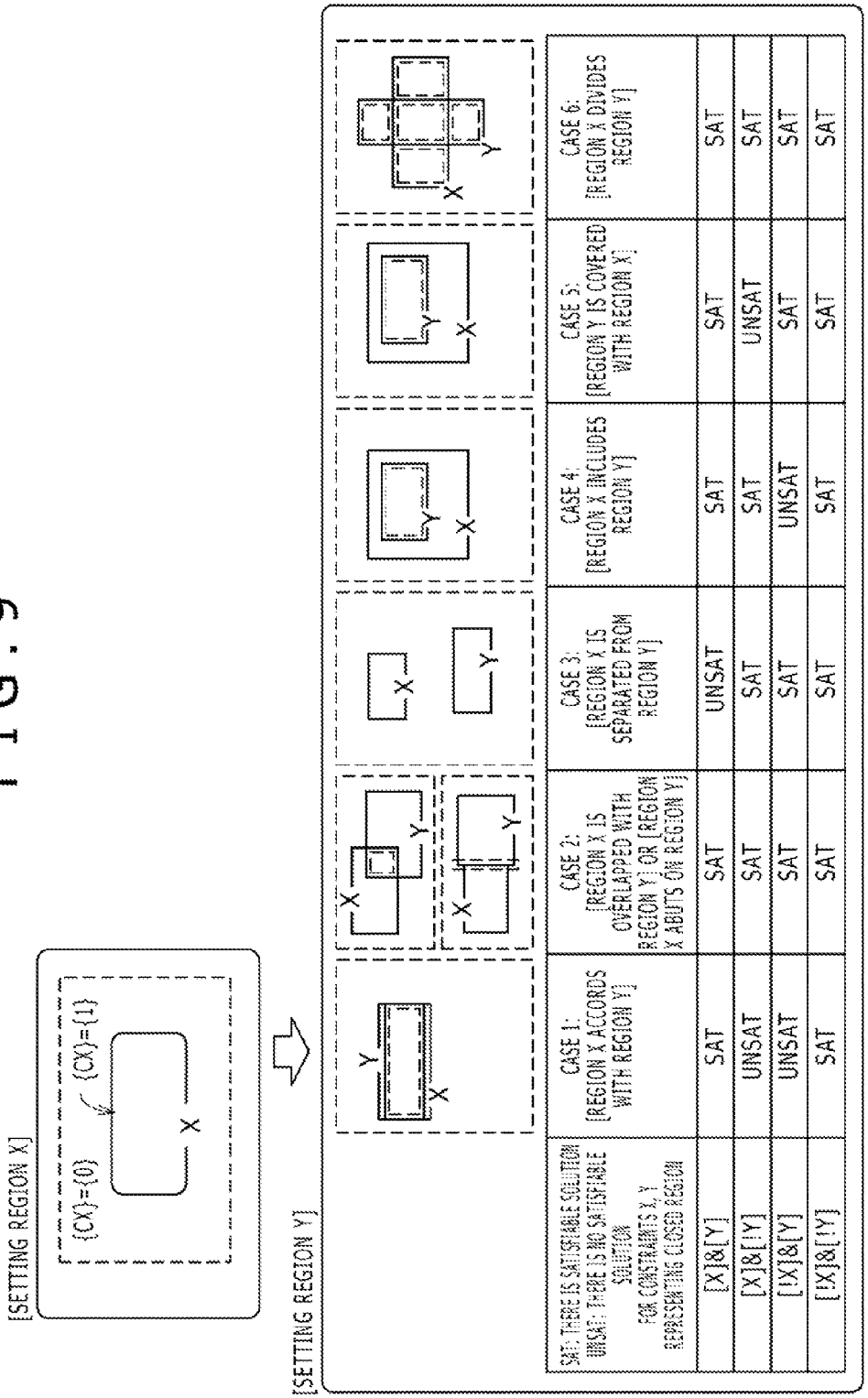
FIG. 9 shows the classification of connection relation between two closed regions and a determination method.

FIGS. 8 and 9 show data structure that represents connection relation between partial closed regions by binarizing internal state space using a group of constraints equivalent to a closed region defined in the internal state space and its processing method. In this case, the internal state space is binarized by setting the inside including an outer edge of the closed region to 1 and setting the outside to 0. A case that a single closed region Y is newly added in S902 in a situation in which a group of closed regions X is already defined in S901 according to a process flow shown in FIG. 8 is classified into any of a case 1 that two closed regions accord, a case 2 that two closed regions are partially overlapped and are touched, a case 3 that two closed regions are separated, a case 4 that two closed regions are in the relation of inclusion, a case 5 that two closed regions are in the relation of covering, and a case 6 that one closed region divides the other closed region, on the basis of connection relation between the group of closed regions X and the group and the closed region Y as shown in FIG. 9.

In S903, the validity of classification into the case 1 for example is determined when solution that meets the constraint [C0&C1] using the constraint C0 that represents the closed region X and the constraint C0 that represents the closed region Y exists (represented as SAT), no solution that meets the constraint [C0&!C1] exists (represented as UNSAT), no solution that meets the constraint [!C0&C1] exists and solution that meets the constraint [!C0&!C1] exists. As for the other five cases, the criterion of satisfying solution shown in FIG. 9 has only to be similarly applied to the combination of each constraint.

The connection relation of the partial closed regions divided by mutual closed regions is updated in S904 on the basis of the connection relation of the closed regions determined as described above and the region is added on the basis of a result of the update in S905.

Figure 10:
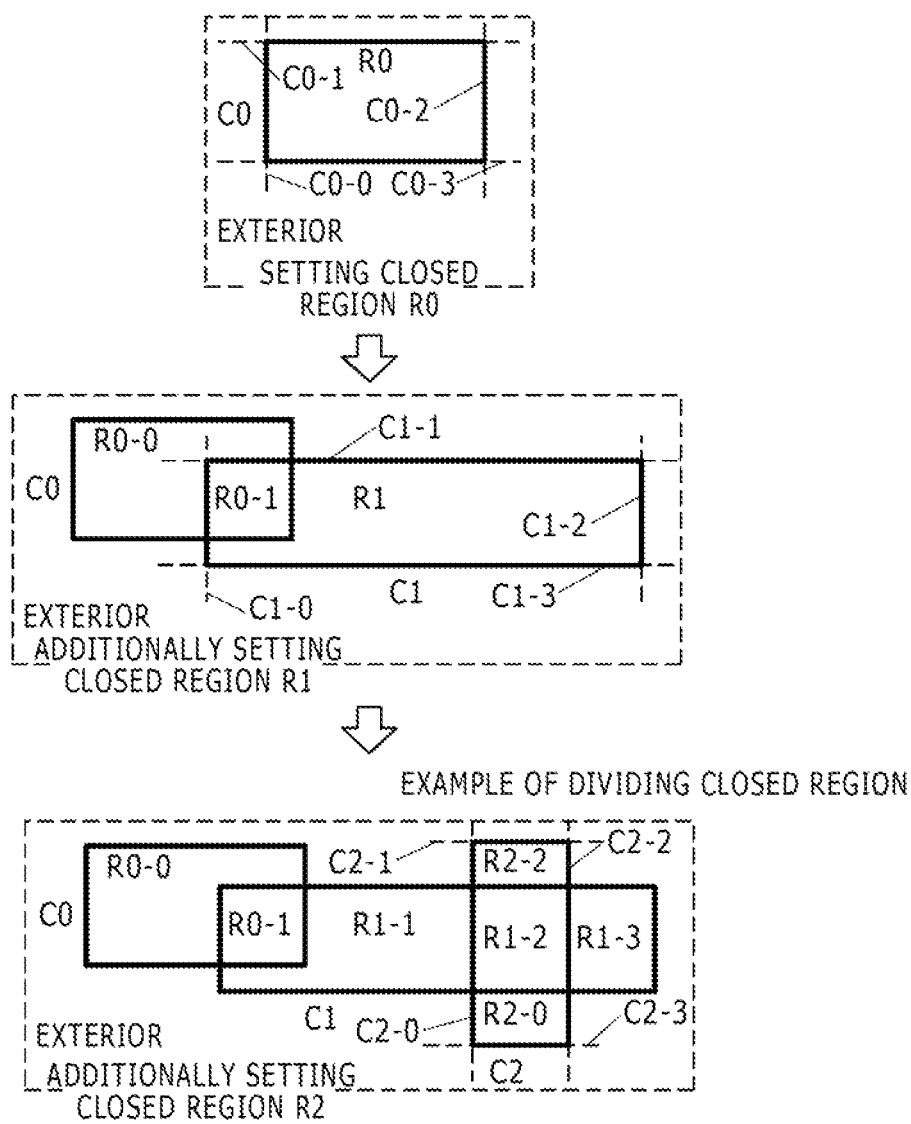
FIG. 10 shows an example of division into partial closed regions.

FIG. 10 shows an example in which the constraint C1 showing the closed region R1 and a constraint C2 showing a closed region R2 are sequentially added to the constraint C0 showing the closed region R0 in the process shown in FIG. 8.

The closed region R0 is defined as a region that meets that the constraint C0 is 1 and the constraint C0 is defined as the logical product of the smallest constraints C0-0, C0-1, C0-2, C0-3. As the constraint C0 divides the closed region R0 into the inside of the closed region (closed region ID=R0) and the outside (closed region ID=EXTERIOR), these divided regions are added in S905.

Therefore, when the closed region R1 defined as a region that meets that the constraint C1 is 1 is added in S902, R1 is newly set as closed region ID. Next, it is determined in S903 that the closed regions R0 and R1 are classified into the case 2 shown in FIG. 9, the closed region R0 is divided into R0-0 and R0-1 in S904, and the closed region R1 is divided into R1-0 and R1-1. Since R0-0 and R0-1, and R1-0 and R1-1 are in succession in the first place, these connection is added, connection relation is updated, and since R0-1 and R1-1 are equivalent to the case 1 (two closed regions accord), connection relation from R0-1 to R1-0 and from R1-1 to R0-1 is added, and connection relation is updated. Further, when the closed region R2 is added, similar processing is also performed.

Figure 11:
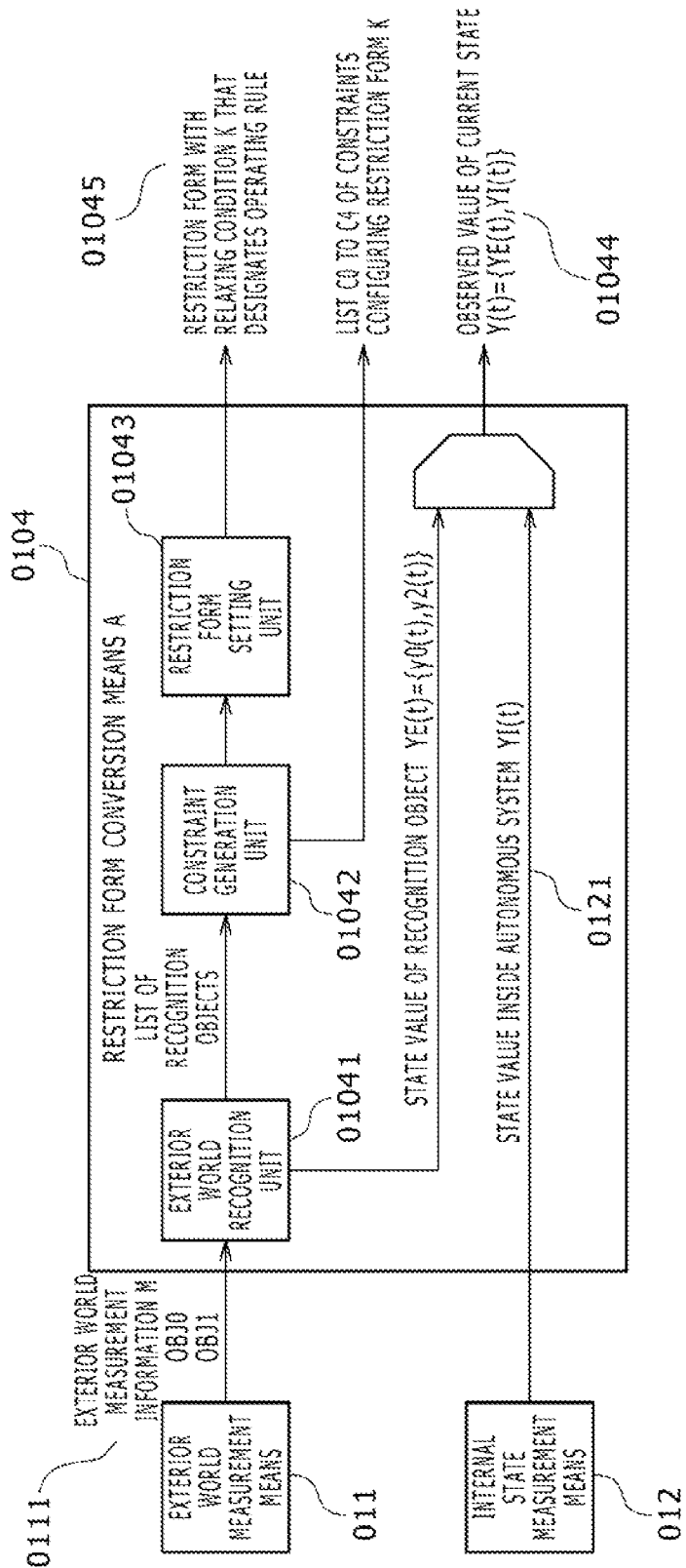
FIG. 11 is a functional block diagram showing restriction form conversion means A.

FIG. 11 is a functional block diagram showing the restriction form conversion means A (0104). The restriction form conversion means A (0104) is provided with the classification of recognition objects, a list of constraints provided in relation to each object and state values of the recognition objects, and a template of a restriction form with a relaxing condition that indicates an operating rule corresponding to the recognition object respectively shown in FIG. 12 as a conversion rule beforehand. A restriction form with a relaxing condition is generated for each recognition object using the conversion rule according to a process flow shown in FIG. 13 and a logical product K (01045) is output to the autonomous operation control unit 0101 together with a list of the restriction forms.

Concretely, an exterior world recognition unit 01041 receives information M (0111) of a recognition object which the exterior world measurement means 011 acquires and classifies the information for each recognition object according to the template of the conversion rule (S1701). The exterior world recognition unit sets a list of constraints for each classification of the recognition object (S1702), acquires and sets a state value for each classification of the recognition object (S1703), and a constraint generation unit 01042 sets a restriction form with a relaxing condition that directs an operating rule specified by the template for each recognition object (S1704). The constraint generation unit generates the logical product K of the set restriction forms with the relaxing condition and outputs it to the autonomous operation control unit 0101 (S1705).

In addition, the state value of the recognition object set via the exterior world recognition unit 01041 is output to the autonomous operation control unit 0101 as an observation point of a current state together with a state value of the inside of the autonomous system 01 which is acquired via the internal state measurement means 012.

The exterior world measurement means 011 is means for acquiring information required when the autonomous system 01 acts in open external environment and is not limited to a passive device represented by an image sensor and a measurement sensor. For one example, the exterior world measurement means may also be a device that receives data input from a system in open external environment to the exterior world recognition unit 01041 via any channel.

Referring to FIGS. 14 to 18, a process in which the expected operation determination logic 0103 outputs a restriction form with a relaxing condition E to the autonomous operation control unit 0101 via the restriction form conversion means B (0105) and resets an output value on the basis of its response (SAT: satisfiable, UNSAT: unsatisfiable, COMP: completed) will be described below.

Figures 14, 15:
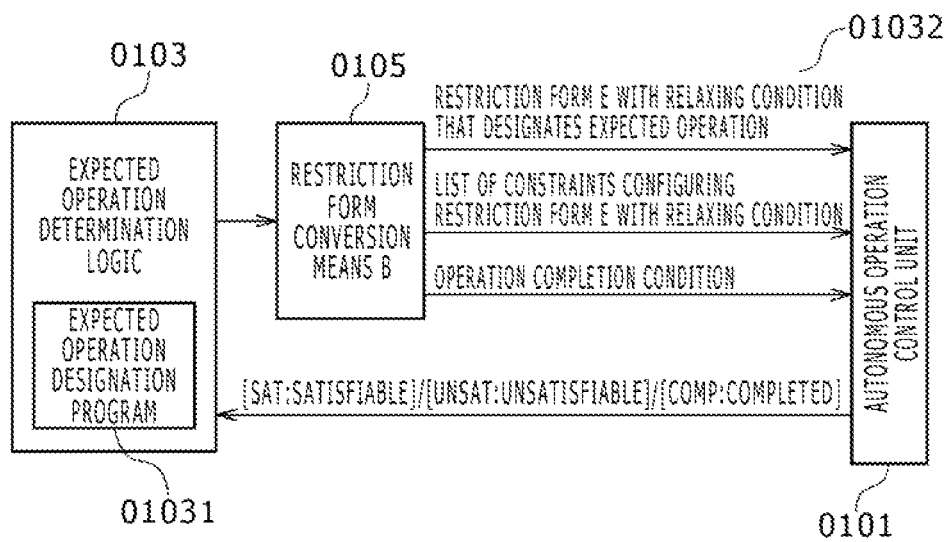
FIG. 14 is a functional block diagram showing restriction form conversion means B.
FIG. 15 shows an example of the description of a program that designates expected operation.

As shown in FIG. 14, the expected operation determination logic 0103 is provided with the expected operation designation program 01031 for generating expected operation shown in an example in FIG. 15 inside and designates the restriction form conversion means B as a list of restriction forms with a relaxing condition according to operation control logic shown in FIG. 16. The expected operation determination logic 0103 continues to operate until an operation termination condition is met from the start of operation according to a process flow shown in FIG. 17, referring to operation ID shown in FIG. 16.

As shown in FIG. 16, the smallest unit of the program that designates expected operation is defined for each individual operation ID, and is operated on the basis of control logic configured by operation 010311 described in a restriction form with a relaxing condition, an operation completion determination condition 010312 described as a constraint and operation ID (010313, 010314, 010315 in order) of a transition destination designated for every three types of responses (SAT, UNSAT, COMP) returned from the autonomous operation control unit 0101 to the expected operation determination logic 0103 as a result of determining the satisfiability of the operation equivalent to the step 024 shown in FIG. 2. In this case, an initial value of the operation ID is described as IDS and a final state is described as IDE.

Figure 17:
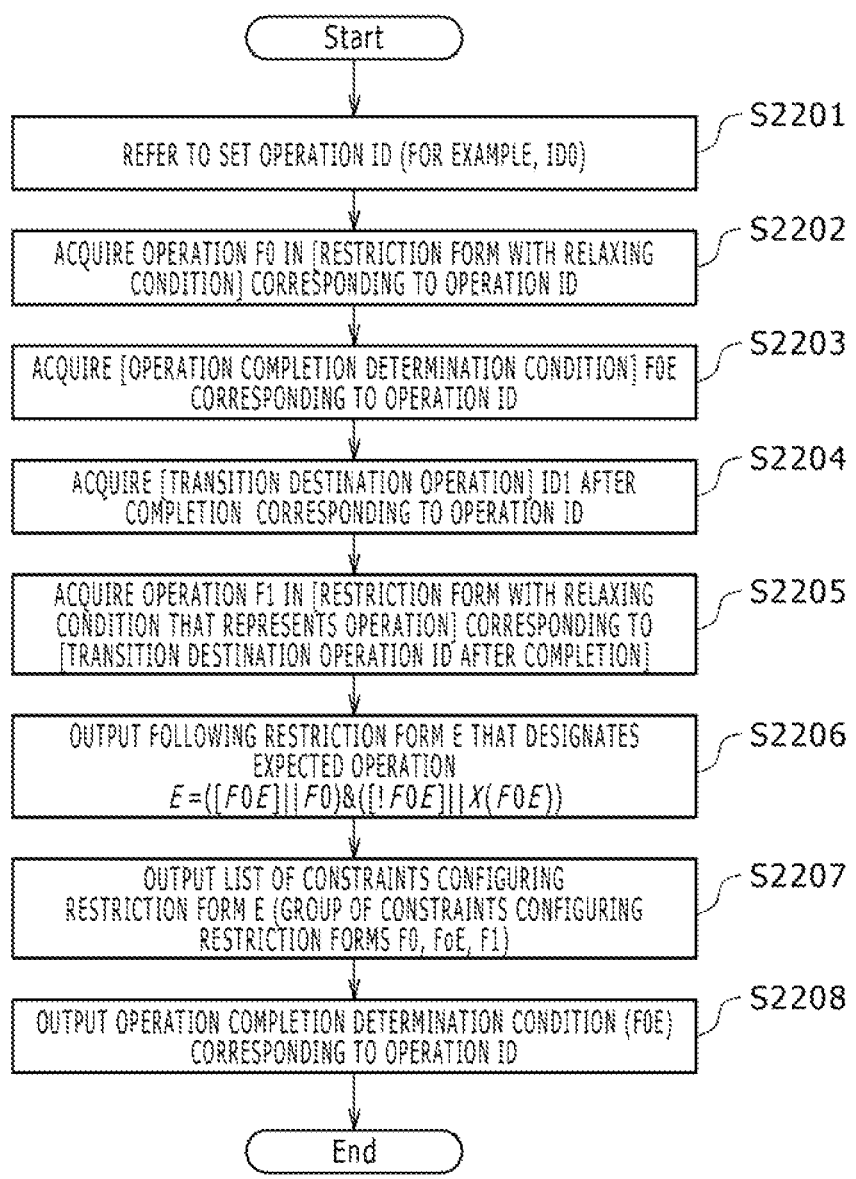
FIG. 17 shows a process flow by the restriction form conversion means B.

FIG. 17 shows the process flow in the restriction form conversion means B (0105). The restriction form conversion means B refers to operation ID designated by the expected operation determination logic 0103 (S2201) and acquires the expected operation E (010311) in a restriction form with a relaxing condition corresponding to the operation ID, the operation completion determination condition 010312 and the operation ID (010314) of the transition destination after the completion of the operation from a branching condition after the acquisition of the response (S2202, S2203, S2204). The restriction form conversion means B acquires the operation 010311 of the restriction form with the relaxing condition corresponding to the acquired operation ID of the transition destination after the completion of the operation (S2205), and outputs the restriction form with the relaxing condition E that designates expected operation, a list of constraints that configure restriction form E and the operation completion condition 010312 to the autonomous operation control unit 0101 (S2206, S2207, S2208).

Figure 18:
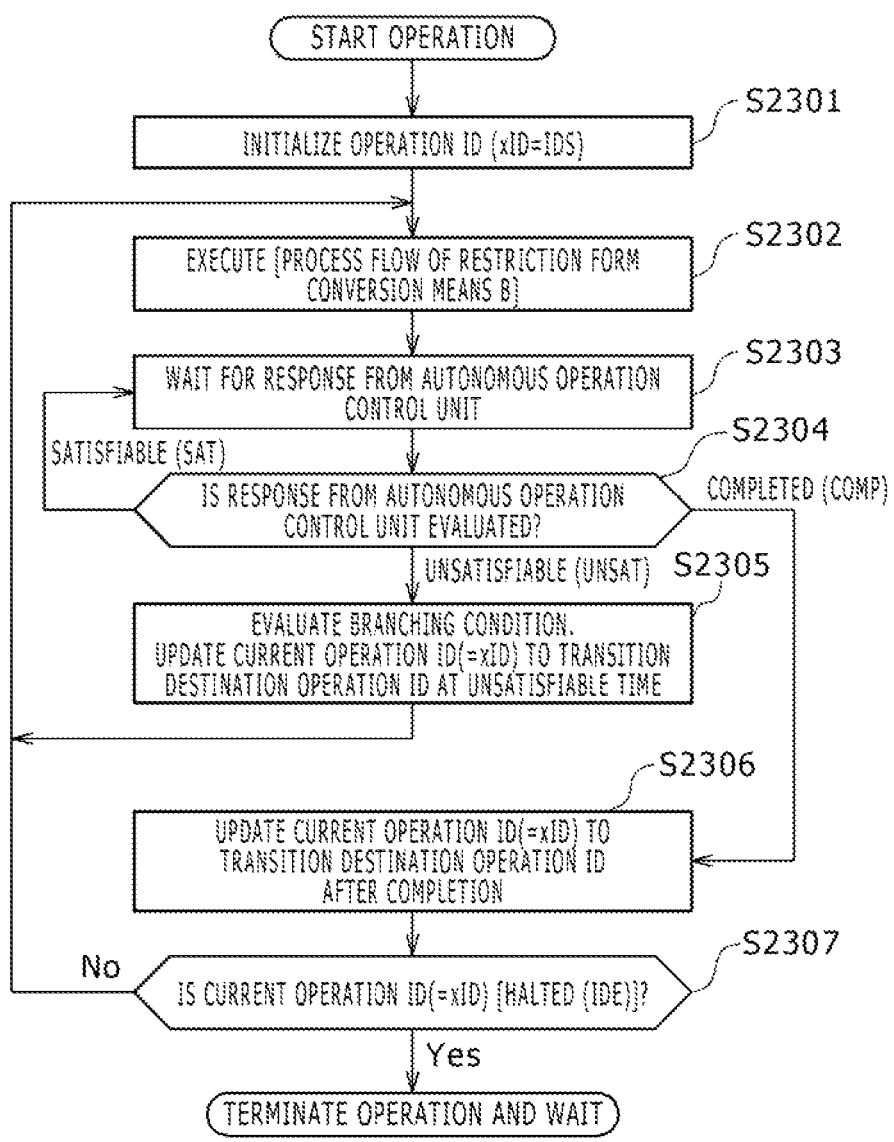
FIG. 18 shows a process flow according to the expected operation determination logic.

FIG. 18 shows a response process to the autonomous operation control unit 0101 using the designated operation ID. In a step S2301, the operation ID is set to an initial value IDS, the process flow shown in FIG. 17 of the restriction form conversion means B is executed (S2302), and a response from the autonomous operation control unit is awaited (S2303). When a response value is SAT (satisfiable), control is returned to S2303 after processing when the response value is "satisfiable" is executed, and a response is successively awaited. When a response value is COMP (completed), a step S2306 is executed. Conversely, when a response value is UNSAT (unsatisfiable), a step S2305 when the response value is "unsatisfiable" is executed. Until operation ID of a transition destination updated in S2306 finally reaches IDE (a final state) as the operation ID by determination processing in S2307, the expected operation determination logic 0103 is continuously operated.

Figure 19:
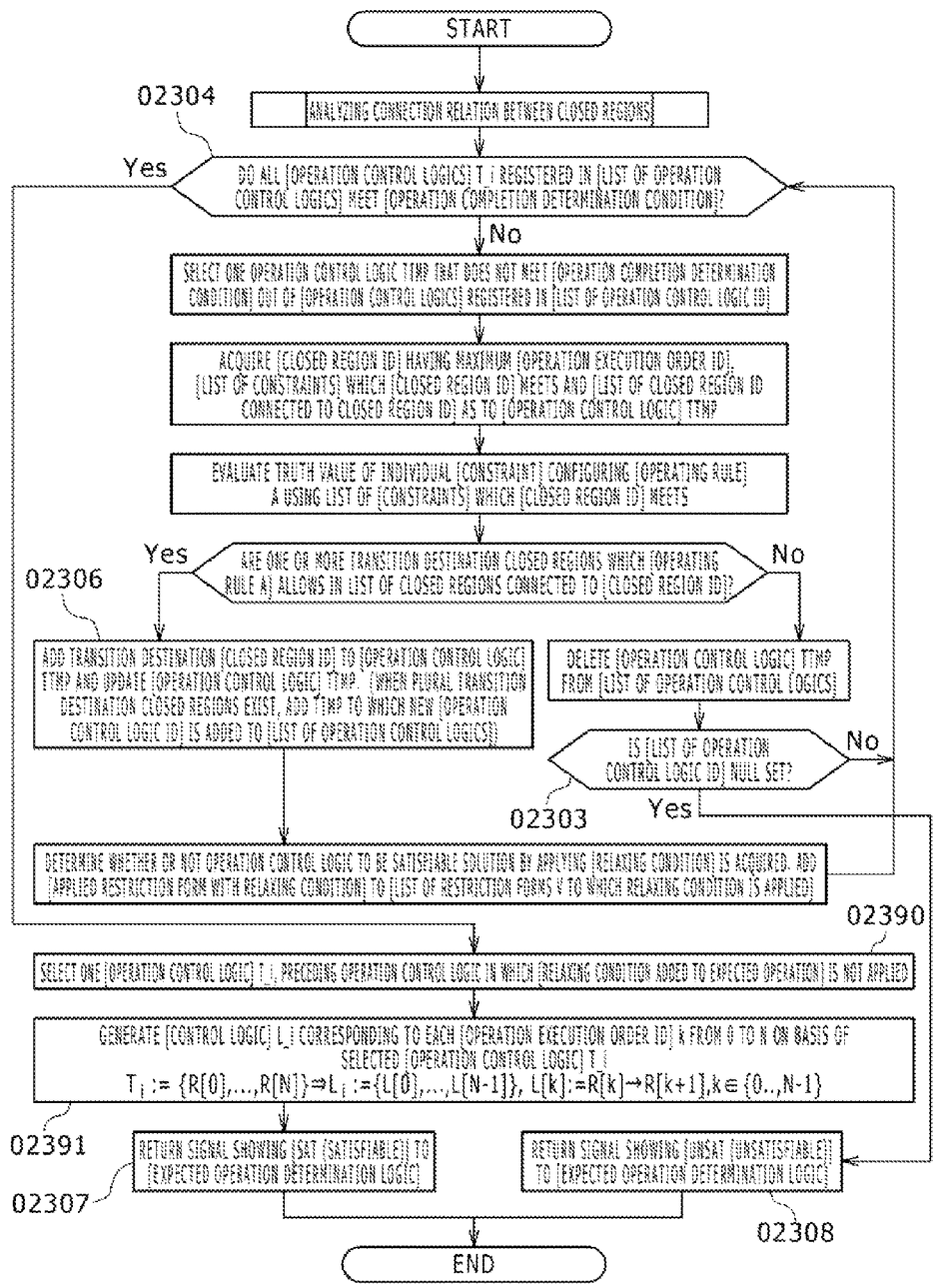
FIG. 19 shows the generation of operation control logic T and control logic L.

FIG. 19 shows a flow of a generation process by the operation control logic T and the control logic L. This is equivalent to the processing in the step 023 shown in FIG. 2.

First, initial processing for analyzing a partial closed region divided by overlap of closed regions and connection relation between the closed regions is executed according to a process flow shown in FIG. 20. First, the restriction form with the relaxing condition K and the list of constraints to be an argument respectively passed to the autonomous operation control unit 0101 as shown in FIG. 11, the restriction form with the relaxing condition E and the list of constraints to be an argument respectively passed to the autonomous operation control unit 0101 as shown in FIG. 14 are acquired.

Correspondence between the partial closed region and the constraint and connection relation between the partial closed regions are generated on the basis of both the lists of constraints according to the process flow shown in FIG. 8 (a step 02301) and a logical state value is generated. In addition, an operating rule A which is a restriction form with a relaxing condition is newly set as a logical product of the restriction forms with the relaxing condition K, E (a step 02305).

Next, a state value of the recognition object shown in FIG. 11 and a group of internal states of the autonomous system 01 acquired from the internal state measurement means 012 are put together and observation information Y (t=0) of a current state is set. A truth value of an individual constraint is evaluated using the observation information Y of the current state and an initial value RINIT of closed region ID to which a binarized state of the autonomous system 01 belongs is specified (a step 02302).

FIG. 21 shows a list of things which can be realized by the operation control logic T generated in the step 023. Initially, the list is a null set and the RINIT is added to a list of operation control logic ID. Unless a list of the operation control logic shown in FIG. 21 is a null set, the following processing is continued.

Referring to the flow shown in FIG. 19 again, it is determined whether all operation control logics T_i registered in a list of the operation control logic T shown in FIG. 21 meet the operation completion determination condition (010312) shown in FIG. 21 (a step 02304). When they meet the operation completion determination condition, a generation process of the operation control logic T is finished and in a step 02390, one operation control logic is selected, taking precedence over the operation control logic to which no [relaxing condition afforded to expected operation] is applied. For one example, the operation control logic having a smaller value of operation execution order ID required until operation is completed may also be selected.

The individual operation control logic T_i is designated as a chain of closed region ID to be varied for each operation execution order ID, and truth values of one or more constraints are necessarily inverted in transition between closed regions according to the definition of the closed region shown in FIG. 3. The control logic L corresponding to each transition between closed regions is defined as a constraint in a step 02391 utilizing this characteristic according to a procedure shown in FIG. 19.

Next, the autonomous operation control unit 0101 returns a response of SAT (satisfiable) to the expected operation control logic 0103 (a step 02307) and terminates the operation.

Conversely, when operation control logic that does not meet the operation completion determination condition (010312) remains in the list shown in FIG. 21 (a step 02304: No), processing for generating the operation control logic T is continued.

Then, one operation control logic that does not meet the operation completion determination condition (010312) is selected from the list shown in FIG. 21 and shall be called TTMP. As for TTMP, after closed region ID corresponding to maximum operation execution order ID shown in FIG. 21 is acquired, a truth value of each constraint that configures the closed region is evaluated and is binarized, it is evaluated on the basis of respective closed region ID whether there is a transition destination closed region which has connection relation and meets the operating rule A set in the step 02305.

When there is none, the operation control logic TTMP is deleted and the process proceeds to a step 02303. In the step 02303, when the list of the operation control logic T shown in FIG. 21 is a null set, the autonomous operation control unit 0101 returns a response of UNSAT (unsatisfiable) to the expected operation control logic 0103 (a step 02308) and terminates the operation.

Conversely, when one or more transition destination closed regions exist, the process proceeds to a step 02306 and update to operation control logic in which the transition destination closed region is added to the operation control logic TTMP is made. In addition, when transition to the transition destination closed region is realized by applying any relaxing condition in the operating rule A set in the step 02305, the relaxing condition V is recorded in the corresponding location corresponding to the operation control logic TTMP shown in FIG. 21.

The abovementioned process is continued until the process finally reaches the step 02307 or 02308 and is finished. At the time of the finish, the autonomous operation control unit 0101 terminates the step 023.

Figure 22:
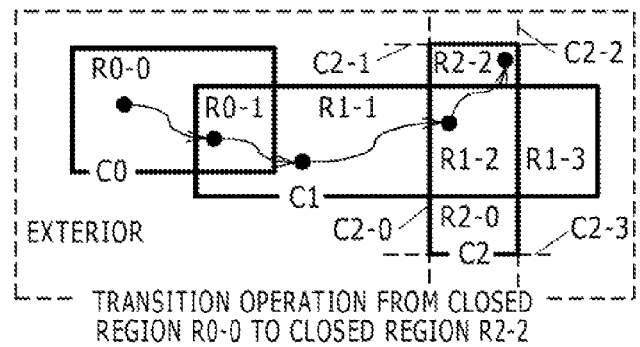
FIG. 22 shows moving operation between two closed regions which the operation control logic shown in FIG. 21 designates.

FIG. 22 shows a problem that operation that moves from a state in which the closed region ID shown in FIG. 10 is R0-0 to a closed region having the closed region ID of R2-2 in a range where the region ID is not EXTERIOR is generated. In this case, according to the process flow shown in FIG. 19, the operation from R0-0 finally toward R2-2 via R0-1, R1-0, R1-1, R1-2 and R2-1 is generated, and finally, the operation control logic shown in FIG. 21 is acquired.

When the process reaches the step 02307 shown in FIG. 19, it is regarded in the step 024 that the verification succeeds and the process proceeds to the step 026. In the step 026, the list T (02392) of the operation control logic generated according to the process flow shown in FIG. 19 and control logic L_i correlated with individual operation control logic T_i are all stored in the recording unit 0102. The process proceeds to the step 027, the control logic L is executed, and a control command is output to the drive device 014.

Figure 25:
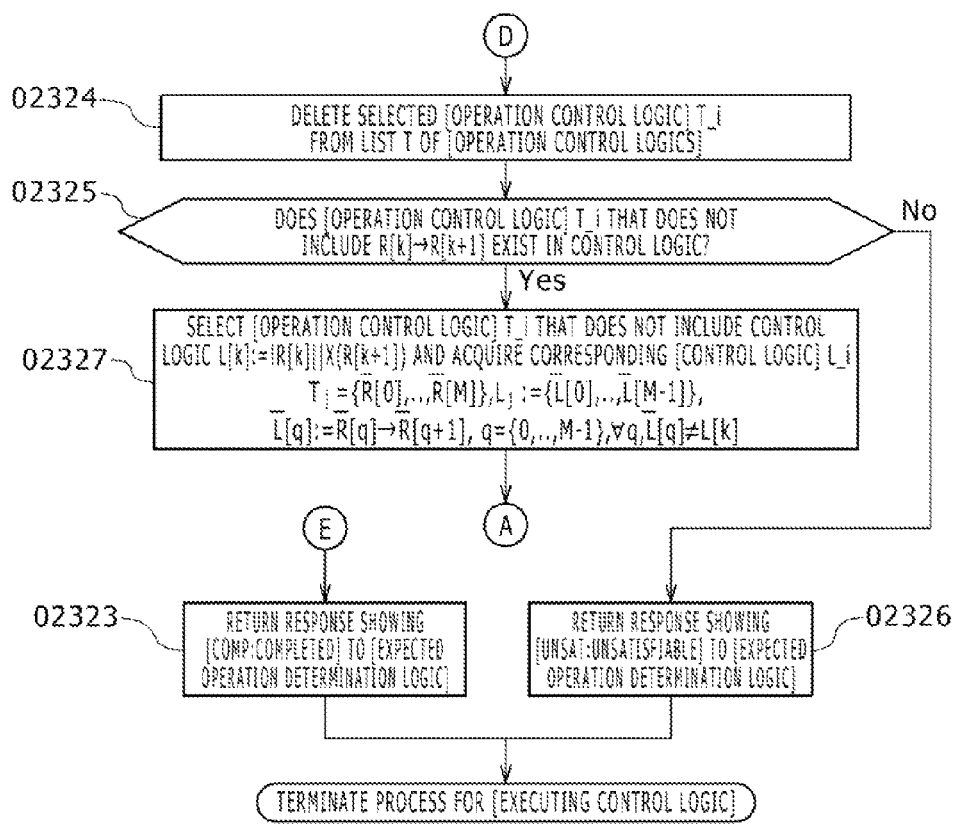
FIG. 25 shows a flow of the execution process of the control logic.

A process flow for converting the operation control logic T and the control logic L respectively generated in FIG. 19 to a control command will be described using FIGS. 23 to 25 below.

In a step 02309, a dynamic model of the autonomous system 01 which is a control object is acquired. The dynamic model may also be acquired by identifying the system beforehand or may also be generated during operation.

In a step 02310, the control logic L generated in the step 02391 is acquired.

Figures 12, 13:
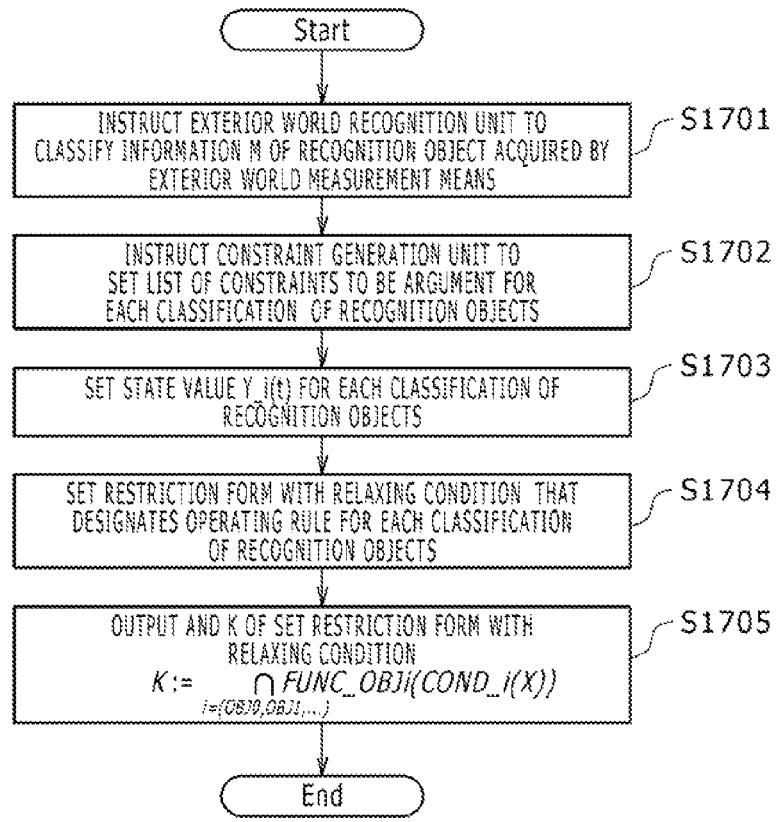
FIG. 12 shows a conversion rule which the restriction form conversion means A uses.
FIG. 13 shows a flow of a process by the restriction form conversion means A.

In a step 02311, a truth value of the list of constraints shown in FIG. 12 is evaluated using an observed value 01044 of the current state and the closed region ID to which the corresponding state value belongs is calculated.

In a step 02312, control logic L[k] immediately executed from the current state is selected out of the control logics L_i acquired in the step 02310.

If there is a group of relaxing conditions V[k] corresponding to the control logic L[k] in FIG. 20, the messages shown in FIG. 7 are presented on the presentation device 013 for each applied individual relaxing condition in a step 02329.

A purpose of the utilization of the presentation device is to present an unsatisfiable restriction form caused in a process in which the autonomous system executes expected operation to the outside and the presentation device is not limited to a visual display. For example, presented contents may also be transmitted to another system that exists in open external environment via a channel.

In steps 02313, 02314, logical state values corresponding to an individual constraint that provides a transition source closed region and a transition destination closed region are acquired and in a step 02315, a constraint Cp the truth value of which is inverted is specified. This constraint defines an invaded or left closed region in a process from the transition source closed region toward the transition destination closed region according to the control logic L[k].

A truth value of a constraint described in a step 02316 is evaluated and the process proceeds to a step 02317 or a step 02318.

The step 02317 is equivalent to operation that enters inside from the outside of a closed region Cp. At this time, a constraint described in the step 02317, that is, an extended closed region Cp acquired by extending the closed region Cp at suitable ratio γ realizes operation that enters the transition destination closed region, remaining in the transition source closed region by calculating a minimum integer value of an extending parameter s which comes to include an observed value Y(t) of the current state for the first time.

In a step 02319, it is determined whether or not such a control input string that an observed value 01044 of the current state gradually approximates the inside of the closed region Cp exists. When the control input string exists, a calculated control input value is output to the drive device 014 and in a step 02322, an operation completion determination condition 010312 to be satisfied after the control logic L[k] is sequentially executed is evaluated. When an operation completion condition is not met, the process is returned to the step 02317, when the operation completion condition is met, the process proceeds to a step 02323, the completion (COMP) of the operation is transmitted to the expected operation determination logic 0103, and the step 027 is finished. Conversely, when no control input string exists in the step 02319, the corresponding control logic L is judged as unexecutable and operation control logic T_i corresponding to the operation control logic L selected in the step 02310 is deleted from the list of operation control logic registered in FIG. 21.

The process proceeds to a step 02325 and operation control logic that does include the control logic L[k] determined as unexecutable in the step 02319 is searched in FIG. 21. When the corresponding operation control logic exists, the process proceeds to a step 02327, the corresponding operation control logic and the control logic are reset, and the process is returned to the step 02311. When the corresponding operation control logic does not exist, the process proceeds to a step 02326, UNSAT (unsatisfiable) is returned to the expected operation control logic 0103, and the process is finished.

In the meantime, the step 02318 is equivalent to operation that goes outside from the inside of the closed region Cp. In this case, a constraint described in the step 02318, that is, a reduced closed region Cp acquired by reducing the closed region Cp at suitable ratio γ realizes operation that gets out of the transition source closed region, remaining in the transition destination closed region by calculating a maximum integer value of a reducing parameter s that includes an observed value Y(t) of the current state. In a step 02320, it is determined whether or not such a control input string that the observed value 01044 of the current state gradually approximates the inside of the closed region Cp exists.

When such control input string exists, a calculated control value is output to the drive device 014 and in step 02328, the operation completion determination condition 010312 to be satisfied after the control logic L[k] is sequentially executed is evaluated.

When the operation completion condition is not met, the process is returned to the step 02318 and when the condition is met, the process proceeds to the step 02323, COMP (the completion of the operation) is transmitted to the expected operation determination logic 0103, and the step 027 is finished.

Conversely, when no control input string exists, the corresponding control logic L is judged unexecutable in the step 02320 and the operation control logic T_i corresponding to the control logic L selected in the step 02310 is deleted from the list of operation control logics registered in FIG. 21.

The process proceeds to the step 02325 and operation control logic that does not include the control logic L[k] determined as unexecutable in the step 02319 is searched in FIG. 21. When the corresponding operation control logic exists, the process proceeds to a step 02327, the corresponding operation control logic and the control logic are reset, and the process is returned to the step 02311. When the corresponding operation control logic does not exist, the process proceeds to the step 02326, a response of UNSAT (unsatisfiable) is returned to the expected operation control logic 0103, and the process is finished.

Figure 26:
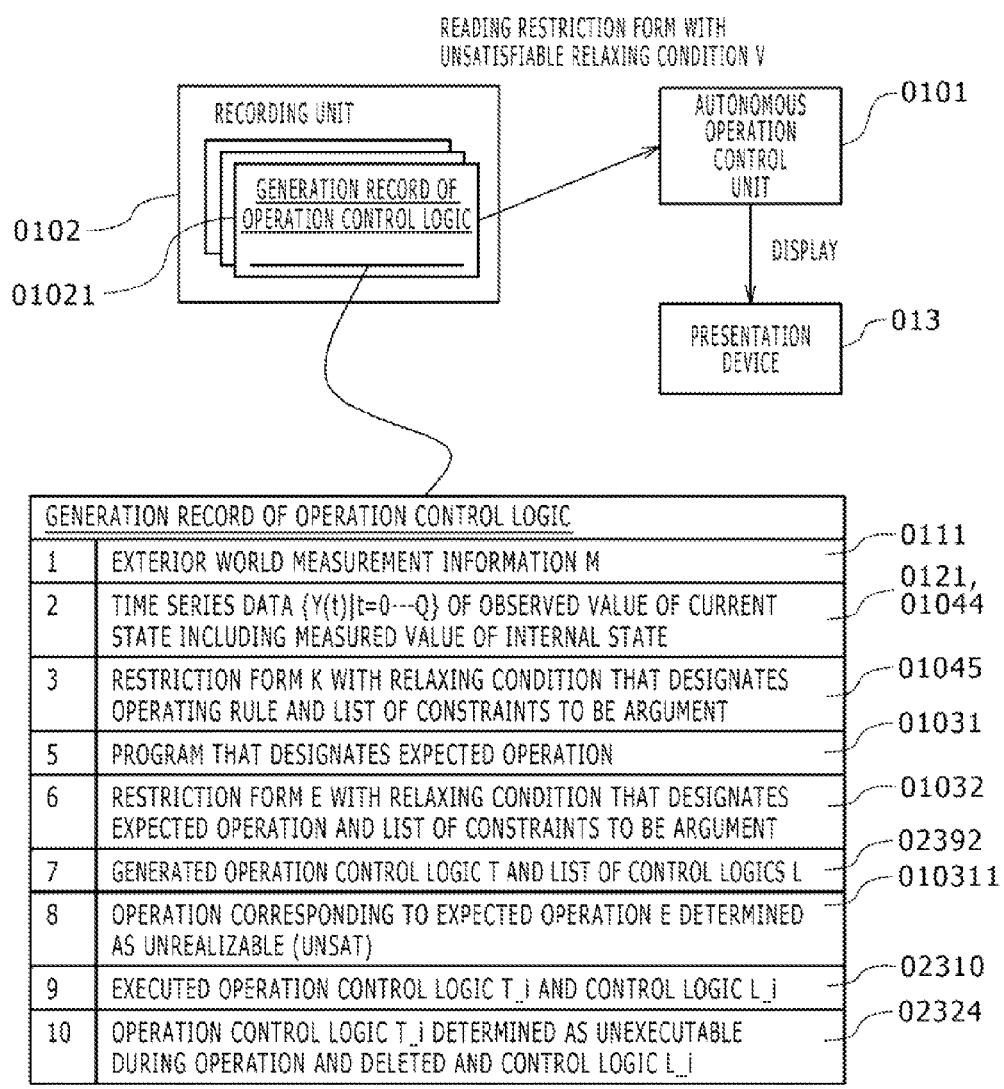
FIG. 26 shows information stored in a recording unit and a method of utilizing a presentation device.

FIG. 26 shows the generation record 01021 of the operation control logic stored in the recording unit 0102 in the whole process shown in FIG. 2 and modes of operation which the autonomous operation control unit 0101 outputs to the presentation device 013 in the step 02329.

The generation record 01021 of operation control logic at least includes the exterior world measurement information (0111), time series data of the observed value 01044 of the current state, the restriction form K (01045) with a relaxing condition that designates an operating rule shown in FIG. 11 and the list of constraints to be an argument, the program 01031 that designates expected operation, the restriction form E (01032) with a relaxing condition that designates expected operation and the list of constraints to be an argument, the list T (02392) of the operation control logic shown in FIG. 20 and determined at the time of the step 02390 and the control logic L correlated with each operation control logic, the operation 010311 corresponding to the expected operation E determined as UNSAT (unsatisfiable) in the step 02308 or 02326, the control logic L selected and executed in the step 02310 in the step 027, the operation control logic T_i determined as unexecutable and deleted in the step 02324 during operation and the control logic L_i correlated with the corresponding operation control logic T_i.

The abovementioned embodiment realizes the autonomous operation control unit 0101 which determines whether or not a requirement for providing the soundness of operation becomes unsatisfiable (02326) or expected operation is unrealizable (the step 02308) during operation, which reconstructs an operation mode during operation (the step 02327) using a function (the steps 023 and 024) for leading the satisfiable combination of a requirement that provides sound operation and expected operation and which generates control logic for realizing the expected operation in parallel, and the autonomous system 01 which is provided with a function for recording an external factor that dynamically varies in open environment, a requirement (01045 realized in the form of a restriction form with a relaxing condition) that provides the soundness of operation, expected operation (01032 realized in a restriction form with a relaxing condition), and generated control logic (02392) in the recording unit 0102 in a form in which a third party can read them and which is operated, presenting them to the third party as required.

When the autonomous operation control unit 0101 inside the autonomous system 01 reaches UNSAT (unsatisfiable) in the step 02308 or the step 02326, all operations designated by the expected operation determination logic 0103 are similarly turned unsatisfiable, the operation ID inside the expected operation determination logic is turned IDE (a halt), and the operation is halted.

A third party that evaluates the soundness of the operation of the autonomous system can know a process (the step 02324) in which individual operation 010311 sequentially designated by the expected operation determination logic 0103 is finally determined as unrealizable (UNSAT) by processing inside the autonomous operation control unit 0101 and a cause of unsatisfiability, especially in records stored in the recording unit 0102 by the autonomous system 01 turned the abovementioned state.

A case that individual operation is turned unsatisfiable is equivalent to a case that the restriction form K with a relaxing condition which is generated on the basis of measurement information M of an exterior world and which designates the operating rule and the restriction form E are both turned unsatisfiable in this embodiment.

A designer of the autonomous system 01 solves, for example, by means such as modifying the program 01031 that generates the restriction form E (01032) determined as unsatisfiable and designates expected operation, modifying the restriction form K with a relaxing condition that designates the operating rule set in the restriction form setting unit 01043 or newly adding a restriction form for preventing from entering open operating environment related to the restriction form K (01045) turned in a situation determined as unsatisfiable to the restriction form setting unit 01043.

Finally, the exterior world measurement information M (0111) related to the autonomous system 01 and stored in the recording unit 0101 is virtually transmitted to the exterior world recognition unit 01041, the program 01031 that designates stored expected operation is passed to the expected operation determination logic 0103, the process flow shown in FIG. 2 is executed again, and the third party evaluates that no unsatisfiability occurs in the step 02308 and the step 02326.

The third party can readily evaluate that the contents modified by the designer are suitably executed via this process.

Second Embodiment

Figure 27:
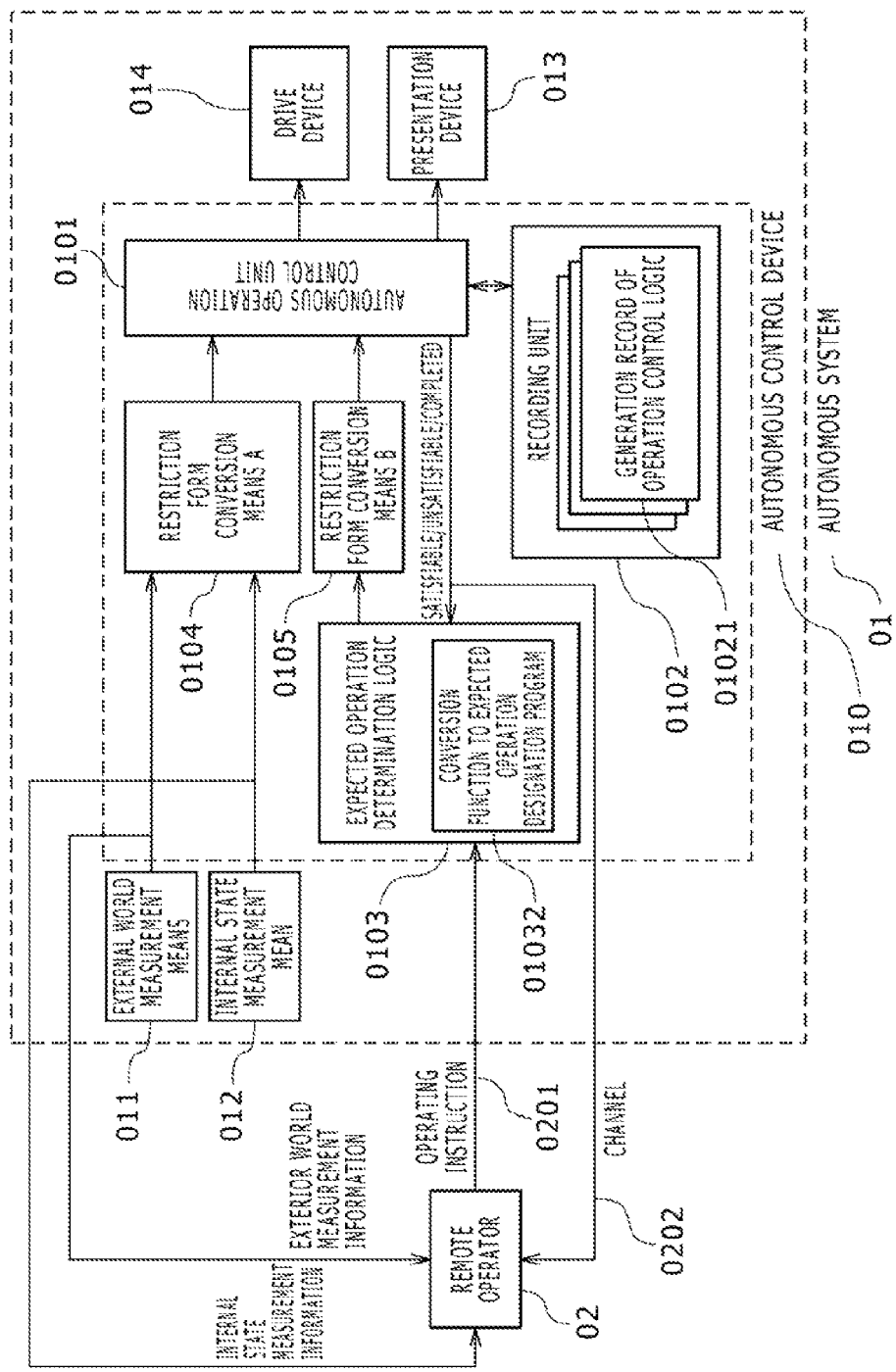
FIG. 27 shows the control of the autonomous system by a remote operator.

FIG. 27 shows one embodiment of an autonomous system provided with a function for a remote operator 02 to operate via a channel.

The autonomous system 01 configured as described in the first embodiment is arranged in a remote location, an operating instruction 0201 is issued as required, referring to exterior world measurement information and infernal state measurement information respectively acquired via the channel 0202, and conversion (01032) to expected operation is made inside expected operation determination logic. In a situation in which operation control logic T cannot be generated, the remote operator executes processing executed in a step 025 in place so that satisfying solution that realizes sound operation exists.

In Patent Literature 3, a method of using operation in a complete autonomous mode and operation by remote control at real time together is described. However, in the case of remote control at real time, the soundness of operation depends upon the quality of a channel, that is, factors such as a band, response delay time and the disconnection of a channel.

Actually, in the case of operation in a remote location, delay time required for communication is not fixed and the arrival of communication data is not guaranteed. This defect has only to be solved by transmitting expected operation by the remote operator 02 as required on the basis of an autonomous operation mode configured so that the realizability of the expected operation can be determined, as disclosed in the second embodiment.

The issue and update of various expected operations are easily enabled without depending upon the quality of a channel by such configuration and the availability of remote control can be greatly enhanced, guaranteeing the soundness of the operation of the autonomous system operated in a remote location.

The enhancement of the availability emerges in that essentially, the number of autonomous systems which each remote operator can operate can be greatly increased.

From a viewpoint of the soundness of operation, one remote operator is required to control one remote autonomous system for each communication frequency and this determines a limit of availability in conventional type configuration.

The autonomous system itself executes a function related to the determination of the soundness of operation and solution by applying this embodiment. Therefore, the remote operator has only to execute remote control operation for the autonomous system only when expected operation generated from the operating instruction becomes unsatisfiable. As a result, one remote operator transmits an operating instruction to plural autonomous systems and can instruct the plural autonomous systems to operate in parallel.

Third Embodiment

For a third embodiment, an example of a running control function of an autonomous running system to which the present invention is applied in open urban environment will be described below.

Figure 28:
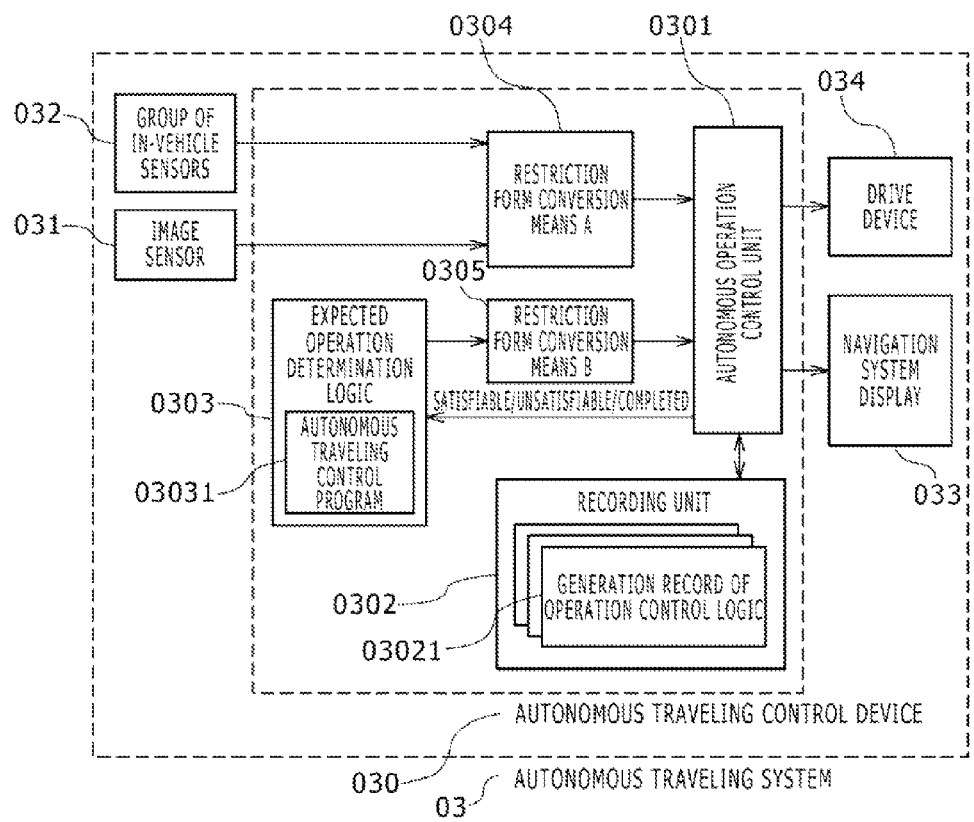
FIG. 28 is an internal block diagram showing an autonomous running system.

FIG. 28 is a block diagram showing the autonomous running system 03.

The autonomous running system 03 operated in open external environment is configured by an autonomous running control device 030, exterior world measurement means 031, internal state measurement means 032, a presentation device 033 and a drive device 034, and the autonomous control device 030 is configured by an autonomous running control unit 0301, a recording unit 0302, expected operation determination logic 0303, restriction form conversion means A (0304) and restriction form conversion means B (0305).

Figure 29:
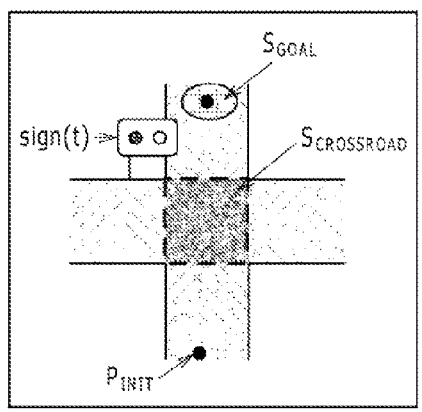
FIG. 29 shows the autonomous running system that enters an intersection.

FIG. 29 shows the appearance of operating environment when the autonomous running system 03 shown in FIG. 28 executes operation such as crosses an intersection with a signal and advances toward a target spot SGOAL.

FIG. 30 shows instructions to operate described in an autonomous running control program 03031 in this embodiment. In this drawing, as described in relation to FIG. 16, while operation ID is ID0, operation that advances toward SGOAL from an initial state (030311, 030312) is shown. When the autonomous operation control unit 0301 determines that expected operation is satisfiable (030313), the expected operation is continued and the operation ID is kept ID0. When the autonomous operation control unit 0301 determines that expected operation is unsatisfiable (030315), the expected operation is cleared and the operation ID is set to IDE. Subsequently, the restriction form conversion means A (0304) is designated via the exterior world measurement means from the operating environment shown in FIG. 29. The mode migrates from a restriction form K with a relaxing condition showing an operating rule to a mode for generating operation.

In this embodiment, a period in which operation ID is ID0 is especially taken up.

FIG. 31 is equivalent to the conversion rule used by the restriction form conversion means A and shown in FIG. 12 in this embodiment. For a recognition object, a road, a signal, an intersection, a pedestrian and a vehicle are taken up.

A list of constraints that define each recognition object and the restriction form K with a relaxing condition to which a state value of a recognition object is introduced when contents indicated by the recognition object temporally varies as represented by a signal and which designates an operating rule for each recognition object are shown.

In addition, output contents to a display 033 are set corresponding to the satisfiability of each restriction form K with a relaxing condition.

First, the autonomous operation control unit (0301) in the autonomous running system in the operating environment shown in FIG. 29 analyzes connection relation of a closed region set for each recognition object by a process equivalent to the process flow (the step 02301) for analyzing connection relation between closed regions shown in FIG. 20.

Next, an exterior world recognition unit 03041 inside the restriction form conversion means A (0304) registers every object recognized via an image sensor 031 according to the format shown in FIG. 12 as shown in FIG. 32 as a road 0 in a direct direction, a road 1 in a transverse direction, a signal 0 for traffic control and an intersection 0 of a control object for example. A constraint generation unit 03042 sets a group of constraints for each recognition object according to contents defined in FIG. 31. A restriction form setting unit 030413 sets the restriction form K with a relaxing condition for each recognition object according to the contents defined in FIG. 31.

FIG. 26 shows operation control logic T equivalent to FIG. 21 in the operating environment in this embodiment. The operation control logic that realizes expected operation acquired in the process flow shown in FIG. 19 and shown in FIG. 30 is shown. To facilitate understanding, a case that a state value of the signal registered as the recognition object in FIG. 32 is not red and a constraint $C5$ is 0 is given for an example.

At this time, control operation is started from the inside of a closed region R0-0-1 in an initial state, and the logic of operation that moves to each inside of a closed region R0-1-1, a closed region R0-2-0-1 and finally, a closed region R0-2-1-1 is shown. This operation meets an operation completion determination condition when the operation ID is ID0 shown in FIG. 30, that is, a condition on which as constraint $C3$ is 1 and expected operation is realized.

Figure 23:
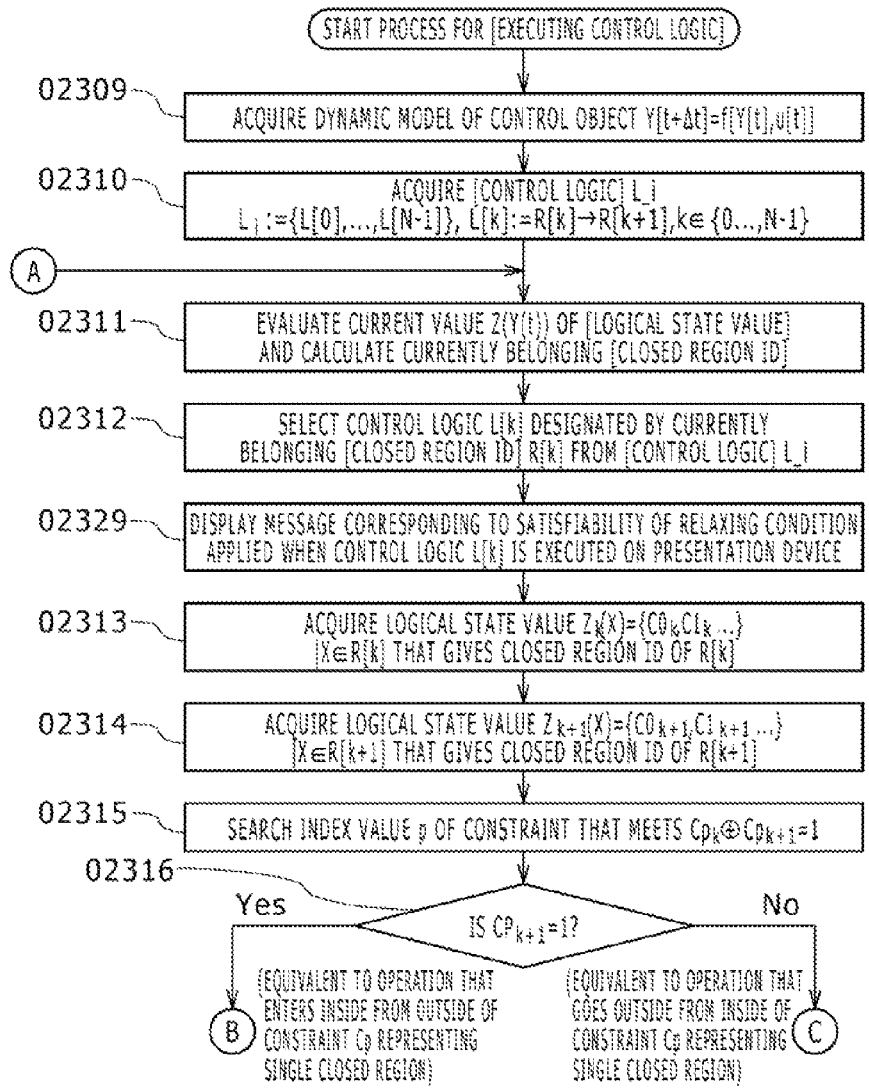
FIG. 23 shows a flow of an execution process of the control logic.

In the operating environment in this embodiment, operation is successively continued as a process till entrance into a certain region in an intersection, remaining in a region of a road 0 by operation realized via the generation process flow of control logic shown in FIG. 23 using control logic L[0] equivalent to a process of the transition from 0 to 1 of operation order ID shown in FIG. 26 according to the process flow shown in FIG. 23 until the operation completion determination condition (030312) on which operation execution order ID shown in FIG. 26 is equivalent to 3 and which is shown in FIG. 30 is met. Afterward, as shown in FIG. 30, the operation ID is transferred to IDE and the operation is halted.

INDUSTRIAL APPLICABILITY

The present invention can be utilized for a fully autonomous traveling vehicle operated in open environment including a public road, a driver less taxi traveling toward a position in which a passenger waits and driverless rental car service. Besides, the present invention can be utilized for an auto cruise function for traveling at fixed speed without being touched to a circumferential traveling vehicle and an automobile provided with a collision avoidance function. Moreover, the present invention can be utilized for a machine that controls via a channel in a remote location represented by a mine, a location deep under the ground and a seabed, autonomously judges so that a constraint related to safety in work is met and is operated.

LIST OF REFERENCE SIGNS

01 Autonomous system
010 Autonomous control device
011 Exterior world measurement means
012 Internal state measurement means 013 Presentation device
014 Drive device
0101 Autonomous operation control unit
0102 Recording unit
01021 Generation record of operation control logic
0103 Expected operation determination logic
01031 Expected operation designation program
0104 Restriction form conversion means A
01041 Exterior world recognition unit
01042 Restriction form generation unit
01043 Restriction form setting unit
01044 Observed value of current state
01045 Restriction form K with relaxing condition
0105 Restriction form conversion means B
02 Remote operator
0201 Operating instruction
0202 Channel
03 Autonomous traveling system
030 Autonomous traveling control device
0301 Autonomous operation control unit
0302 Recording unit
03021 Generation record of operation control logic
0303 Expected operation determination logic
0304 Restriction form conversion means A
0305 Restriction form conversion means B
031 Image sensor
032 Group of in-vehicle sensors
033 Navigation system display
034 Drive device

The invention claimed is:

1. An autonomous control device that generates operation control logic for realizing operation adapted to an internal state of an autonomous system acquired by an internal state measurement sensor and an external factor acquired by an exterior world measurement sensor in open external environment on the basis of operation control logic stored in a recording unit and instructs the autonomous system to operate, the autonomous control device comprising:
first conversion circuitry that:
receives exterior world measurement information of one or more recognition objects acquired by the exterior world measurement sensor and classifies the information for each of the one or more recognition objects according to a conversion rule template,
sets a list of constraints for each classification of the one or more recognition objects,
acquires and sets a state value for each classification of the one or more recognition objects, wherein the set state value of the recognition object is output as an observation point of a current state together with a state value of an inside of the autonomous system that is acquired via the internal state measurement sensor,
sets a first restriction form that directs an operating rule specified by the template for each recognition object, and
generates a first list of the restriction forms;
an autonomous operation control circuitry that:
determines the feasibility of operation control logic for realizing both expected operation and requirements for a feasibility on the basis of a first constraint corresponding to the external factor acquired from the exterior world measurement sensor and the internal state of the autonomous system and a second constraint related to the expected operation demanded for the autonomous system and the feasibility every time the operation control logic is sequentially reconstructed,
generates the operation control logic of the autonomous system and control logic of a drive device that configures the autonomous system,
correlates the generated operation control logic with information acquired from the exterior world measurement sensor,
writes it to the recording unit as a generation record of the operation control logic, and instructs the drive device to operate on the basis of the control logic; and
an expected operation determination circuitry that designates the expected operation demanded for the autonomous system on the basis of a result of the determination of the expected operation and the feasibility by the autonomous operation control circuitry.

2. The autonomous control device according to claim 1, wherein the first or second constraint is a constraint with a relaxing condition on which the first or second constraint is relaxed according to a satisfied state; and
wherein the autonomous operation control circuitry determines the satisfiability of the expected operation and generates control logic corresponding to the instruction of operation in satisfiable case and in unsatisfiable case.

3. The autonomous control device according to claim 2, wherein the autonomous operation control circuitry receives a third constraint in the form of a logical expression or temporal logic including the logical expression and wherein the restriction forms include an allowable limit of relaxation; and
the autonomous control device is further provided with second conversion circuitry that converts sound operation which is operation that meets the expected operation and the soundness to a second restriction form and generates a second list of the restriction forms.

4. The autonomous control device according to claim 3, wherein the control logic is sequentially generated and the expected operation is realized when operation control logic for realizing both a requirement for the sound operation and the expected operation exists; and
the autonomous operation control circuitry specifies a factor of unsatisfiability in the list of restriction forms when no operation control logic exists, selects the list of restriction forms to recover sound operation while satisfying the allowable limit of relaxation of the relaxing condition, and generates operation control logic.

5. The autonomous control device according to claim 2, wherein the autonomous control device presents contents of operation control logic to a presentation device when the sound expected operation can be realized, and the autonomous control device presents a factor to the presentation device when the sound expected operation cannot be realized.

6. A moving body provided with the autonomous control device according to claim 3,
wherein the expected operation is an instruction to travel at specified speed, and the sound operation is operation for avoiding contact with another moving body or an obstruction around the moving body, comprising a function for controlling traveling speed and an orbit of the moving body to make the expected operation and the sound operation compatible.

7. An autonomous control device that produces a control logic based on an operation control logic stored in a recording unit, instructs an autonomous system to operate by using the operation control logic, and commands a drive device of the autonomous system, by using the control logic, to perform a motion adaptively in response to an internal state of the autonomous system and an external factor in open operating environment which is acquired from an exterior world measurement means, the autonomous control device comprising:
an autonomous operation control unit that:
determines a feasibility of any operation control logic for realizing both an expected operation and requirements for a feasibility,
updates the operation control logic and the control logic, every time when:
  a constraint derived from an external factor acquired from the exterior world measurement means, and
  a constraint derived from an internal state of the autonomous system are reconstructed based on any change in a constraint derived from an external factor acquired from the exterior world measurement means, and an internal state of the autonomous system, and a constraint related to the expected operation which is demanded for the autonomous system and the feasibility,
sequentially writes the produced operation control logic and the external factor acquired from the exterior world measurement means to the recording unit, and
commands the drive device to perform a motion of the autonomous system based on the control logic,
an expected operation determination unit that:
designates the expected operation which is demanded for the autonomous system on the basis of a result that the autonomous operation control unit determines the feasibility of the expected operation and the soundness of the respective operation, and
a presentation device on which:
the autonomous control device commands to display the contents of the operation control logic when the sound expected operation can be realized, and
the autonomous control device commands to display a real-time external factor associated with the external factor acquired from the exterior world measurement means when the sound expected operation cannot be realized.

8. The autonomous control device according to claim 7, wherein the constraints are ones with a relaxing condition, and the relaxing condition on the constraint is applied according to satisfiability of the constraint, and
the autonomous operation control unit uses the constraints to:
determine the satisfiability of the expected operation, and
compute the control logic corresponding to the expected operation in both of a satisfiable case and an unsatisfiable case.

* * * * *